(12) United States Patent
Ishida et al.

(10) Patent No.: US 6,839,347 B1
(45) Date of Patent: Jan. 4, 2005

(54) DATA TRANSFER CONTROLLER AND ELECTRONIC DEVICE

(75) Inventors: Takuya Ishida, Sapporo (JP); Yoshiyuki Kamihara, Sapporo (JP); Fumitoshi Wada, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/582,294

(22) PCT Filed: Oct. 26, 1999

(86) PCT No.: PCT/JP99/05902
§ 371 (c)(1),
(2), (4) Date: Oct. 26, 2000

(87) PCT Pub. No.: WO00/25215
PCT Pub. Date: May 4, 2000

(30) Foreign Application Priority Data

Oct. 27, 1998 (JP) .......................................... 10-321488

(51) Int. Cl.$^7$ ............................. H04L 12/28; H04J 3/24
(52) U.S. Cl. ...................... 370/389; 370/423; 370/475; 710/22; 710/305; 714/54
(58) Field of Search ............................ 370/230.1, 257, 370/289, 469, 392, 475, 423; 710/19, 313, 305, 241, 306, 269, 22; 711/104; 714/48, 49, 54

(56) References Cited

U.S. PATENT DOCUMENTS

| | | | |
|---|---|---|---|
| 5,815,678 A | * | 9/1998 | Hoffman et al. ............ 395/309 |
| 5,983,301 A | | 11/1999 | Baker et al. |
| 6,324,178 B1 | * | 11/2001 | Lo et al. ...................... 370/392 |
| 6,542,510 B1 | * | 4/2003 | Fujimori et al. ............ 370/402 |

FOREIGN PATENT DOCUMENTS

| JP | A 4-278741 | 10/1992 |
|---|---|---|
| JP | A-10-23101 | 1/1998 |
| JP | A-10-40211 | 10/1998 |
| JP | A-11-17773 | 1/1999 |

OTHER PUBLICATIONS

Nikkei Electronics 1997 9.8 (No. 698), "Direct Connection of Digital Steel Cameras: Connecting Different Type of Machines by Standardization", pp. 107–111.
"An outline of the IEEE 1394 High Performance Serial Bus" (*Interface*, Apr. 1996, pp. 1–10).
"Bus Standards for PC Peripheral Equipment" (*Interface*, Jan. 1997, pp. 106–116).
"Real–Time Transfer Modes and Multimedia–Capable Protocols for IEEE 1394–1995 (FireWire)" (*Interface*, Jan. 1997, pp. 136–146).

* cited by examiner

*Primary Examiner*—Duc Ho
(74) *Attorney, Agent, or Firm*—Oliff & Berridge, PLC

(57) ABSTRACT

The objective is to provide a data transfer control device and electronic equipment that are capable of reducing processing overheads, thus enabling high-speed data transfer within a compact hardware configuration. In a data transfer control device in accordance with IEEE 1394, a packet shaping circuit (160) shapes each packet that is transferred in from another node into a form that can be used by an upper layer, and a packet division circuit (180) writes the header of the thus-shaped packet into a header area in RAM and the data thereof into a data area. A data pointer that has been passed from the packet division circuit is appended to the header of the packet during packet shaping. Tags are used to divide packets. Information indicating broadcast information, error status information, and whether or not the packet was received during a self-ID period is appended to the trailer of the packet during the packet shaping. The information, such as ACK, that was appended to the rearmost end of the packet in a time series during packet shaping is written to the start of the header of the packet in RAM.

34 Claims, 28 Drawing Sheets

FIG. 1A  ASYNCHRONOUS SUBACTION

FIG. 1B  ISOCHRONOUS SUBACTION

FIG. 4A

SELF-ID PACKET #0

| | b.31 | | | | | | | | | | | b.0 |
|---|---|---|---|---|---|---|---|---|---|---|---|---|
| 0 | 10 | PHY_ID | 0 | L | gap_cnt | sp | del | C | pwr | p0 | p1 | p2 | i | m |
| 1 | INVERSION OF FIRST 32 BITS | | | | | | | | | | | |

FIG. 4B

SELF-ID PACKETS #1, #2, #3

| | b.31 | | | | | | | | | | | b.0 |
|---|---|---|---|---|---|---|---|---|---|---|---|---|
| 0 | 10 | PHY_ID | 1 | n | rsv | pa | pb | pc | pd | pe | pf | pg | ph | r | m |
| 1 | INVERSION OF FIRST 32 BITS | | | | | | | | | | | |

FIG. 4C

LINK-ON PACKET

| | b.31 | | | | | | b.0 |
|---|---|---|---|---|---|---|---|
| 0 | 01 | PHY_ID | 0000 0000 0000 0000 0000 0000 | | | | |
| 1 | INVERSION OF FIRST 32 BITS | | | | | | |

FIG. 4D

PHY CONFIGURATION PACKET

| | b.31 | | | | | b.0 |
|---|---|---|---|---|---|---|
| 0 | 00 | PHY_ID | R | T | gap_cnt | 0000 0000 0000 0000 |
| 1 | INVERSION OF FIRST 32 BITS | | | | | |

RAM (PACKET STORAGE MEANS)

*FIG. 15*

| TAG (DTAG) | MEANING |
|---|---|
| 0 0 | HEADER |
| 0 1 | TRAILER |
| 1 0 | DATA |
| 1 1 | START |

COMPARATIVE EXAMPLE

THIS EMBODIMENT OF THE PRESENT INVENTION

FIG.24A

| b.31 | | | | b.0 |
|---|---|---|---|---|
| DestID | tl | rt | tcode | pri |
| SourceID | (MSB) | | | |
| PacketTypeSpecInfo | | | | (LSB) |
| PacketTypeSpecQuadData | | | | |
| Header CRC | | | | |
| Data | | | | |
| Data CRC | | | | |

FIG.24B

RxAsynchronousPacket    BlockWriteReq, BlockReadResp, LockReq, LockResp

| | b.31 | | | | b.0 |
|---|---|---|---|---|---|
| 0 | DestID | tl | rt | tcode | pri |
| 1 | SourceID | (MSB) | | | |
| 2 | PacketTypeSpecInfo | | | | (LSB) |
| 3 | DataLength | ExtendedTcode | | | |
| 4 | DataPointer | | | | |
| 5 | spd | | BC | HCE | ACK |

FIG. 26A

RxAsynchronousBusResetPacket    (tcode:0xE)

|   | b.31 | | | | b.0 |
|---|---|---|---|---|---|
| 0 | reserved | reserved | tcode | 4'h0 | |
| 1 | DataPointer | | | | |
| 2 | Datalength | | BR | BC | HCE | ACK |

RxAsynchronousPhyPacket Nomal    (tcode:0xE)

|   | b.31 | | | | b.0 |
|---|---|---|---|---|---|
| 0 | reserved | reserved | tcode | 4'h0 | |
| 1 | Phy Packet | | | | |
| 2 | | spd | | BR | BC | HCE | ACK |

↑
1'h0

DATA TRANSFER CONTROLLER AND ELECTRONIC DEVICE

TECHNICAL FIELD

The present invention relates to a data transfer control device and electronic equipment comprising the same.

BACKGROUND OF ART

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-R drives, and hard disk drives, but also to domestic appliances such as video cameras, VTRs, and TVs. This standard is therefore expected to enable a dramatic acceleration of the digitalization of electronic equipment.

The concept of IEEE 1394 is disclosed in various publications, such as "An outline of the IEEE 1394 High Performance Serial Bus" (*Interface*, April 1996, pages 1 to 10), "Bus Standards for PC Peripheral Equipment" (*Interface*, January 1997, pages 106 to 116), and "Real-Time Transfer Modes and Multimedia-Capable Protocols for IEEE 1394-1995 (FireWire)" (*Interface*, January 1997, pages 136 to 146). Texas Instruments TSB12LV31 is known as a data transfer control device that conforms to IEEE 1394.

However, some technical problems have been identified with such a data transfer control device conforming to IEEE 1394, as described below.

That is to say, the current IEEE 1394 standard does make it possible to implement transfer speeds up to a maximum of 400 Mbps. In practice, however, the presence of processing overheads forces the actual transfer speeds of the entire system to be much slower. In other words, the firmware and application software running on a CPU require large amounts of time for processes such as preparing for transmitting data and reading in received data, which means it is not possible to implement high-speed data transfer overall, no matter how fast the data can be transferred over the IEEE 1394 buses.

A particular problem lies in the fact that a CPU incorporated into peripheral equipment has a lower processing capability than the CPU incorporated into the host system, such as a personal computer. This makes the problem of processing overheads in the firmware and application software extremely serious. It is therefore desirable to provide techniques that are capable of efficiently solving this overhead problem.

DISCLOSURE OF THE INVENTION

The present invention was devised in the light of the above described technical problem, and has as an objective thereof the provision of a data transfer control device and electronic equipment using the same which are capable of reducing the processing overheads of firmware and application software, thus implementing high-speed data transfer within a compact hardware configuration.

In order to solve the above described technical problems, a data transfer control device of the present invention for transferring data among a plurality of nodes that are connected to a bus, comprises: packet shaping(reforming) means for shaping each packet that has been transferred from a node into a form that can be used by an upper layer; and packet division means for writing control information of the thus-shaped packet into a control information area of a randomly accessible storage means and data of the thus-shaped packet into a data area of the storage means; wherein the packet division means passes to the packet shaping means a data pointer indicating an address of data written into the data area; and wherein the packet shaping means takes the data pointer passed from the packet division means and appends the data pointer to control information of the packet.

In this invention, the packet shaping(reforming) means takes the data pointer that has been passed from the packet division means and appends it to the control information of the packet. The control information of the packet to which the data pointer has been appended is written to the control information area of the storage means and the packet data is written to the data area thereof. This arrangement makes it possible to reduce the processing load on the upper layers, such as firmware or application software, and thus improve the actual transfer speed of the entire system, by writing the control information to the control information area and the data to the data area. It is simple for an upper layer such as the firmware to use the data pointer to read the data that corresponds to that control information of the packet from the data area. Since the data pointer is appended by the packet shaping means, making it unnecessary for the packet division means to participate therein, the configuration of the packet division means and the processing of writing to the storage means can be simplified.

The packet shaping means may generate tag information for distinguishing between at least control information and data of a packet and may also link the thus generated tag information to the packet; and the packet division means may write control information of the packet to the control information area and data of the packet to the data area, based on the tag information linked to the packet. This arrangement makes it possible to store control information of the packet in the control information area and data in the data area, with a simple hardware configuration.

The packet division means may update a control information pointer indicating an address of control information that is written into the control information area, when it is determined from the tag information linked to the packet that control information of the packet is to be written, or may update a data pointer indicating an address of data that is written into the data area, when it is determined from the tag information linked to the packet that data of the packet is to be written. This arrangement makes it possible to use the tag information to switch between updating the control information pointer and updating the data pointer, thus dividing the packet into control information and data. This helps to simplify the packet division processing.

A data transfer control device of the present invention for transferring data among a plurality of nodes that are connected to a bus, comprises: packet shaping means for shaping each packet that has been transferred from a node into a form that can be used by an upper layer; and write means for writing the thus-shaped packet to a storage means; wherein the packet shaping means takes broadcast information indicating whether or not the packet has been sent to all nodes connected to the bus and appends the broadcast information to control information of the packet.

This invention makes it possible for an upper layer such as the firmware to perceive whether or not a packet that is to be processed was broadcast, simply by checking the broadcast information. This arrangement makes it possible to skip processing such as the decoding of other information, thus reducing the processing load on upper layers such as the firmware.

A data transfer control device of the present invention for transferring data among a plurality of nodes that are connected to a bus, comprises: packet shaping means for shaping each packet that has been transferred from a node into a form that can be used by an upper layer; and write means for writing the thus-shaped packet to a storage means; wherein the packet shaping means takes error status information indicating whether or not there was an error in that packet and appends the error status information to control information of the packet.

This invention makes it possible for an upper layer such as the firmware to perceive whether or not there is an error in a packet to be processed, simply by checking the error status information. This arrangement makes it possible to skip processing such as the decoding of other information, thus reducing the processing load on upper layers such as the firmware.

The data transfer control device may further comprise packet division means for writing control information of the thus-shaped packet into a control information area of the storage means and data of the thus-shaped packet into a data area of the storage means; and data of a packet that has been written to the data area may be invalidated when it is determined that there is an error in the packet. This configuration ensures that only correct data can be continuously stored in the data area, making it possible for an upper layer such as application software to read only correct data in sequence from the data area. This helps to simplify the interface with upper layers.

A data transfer control device of the present invention for transferring data among a plurality of nodes that are connected to a bus, comprises: packet shaping means for shaping each packet that has been transferred from a node into a form that can be used by an upper layer; and write means for writing the thus-shaped packet to a storage means; wherein the packet shaping means takes information indicating whether or not the packet was received during a self-identification period and appends the information to control information of the packet.

This invention makes it possible for an upper layer such as the firmware to perceive whether or not a packet to be processed was received during the self-identification period, simply by checking the information appended to the control information of the packet. It is therefore simple to distinguish between a packet obtained by re-packaging a plurality of self-identification packets, by way of example, from another kind of packet.

A data transfer control device of the present invention for transferring data among a plurality of nodes that are connected to a bus, comprises: packet shaping means for shaping each packet that has been transferred from a node into a form that can be used by an upper layer; and write means for writing the thus-shaped packet to a storage means; wherein the packet shaping means appends given information to the rearmost end of each packet in a time series that has been transferred from each node; and the write means writes the given information at the foremost end of control information of the packet in the storage means.

With this invention, information that has been appended to the rearmost end of a packet in a time series is written to the foremost end of the control information of the packet in the storage means. Therefore, an upper layer such as the firmware can confirm this information in a simple manner, without decoding other information. As a result, it is possible to greatly reduce the processing load on upper layers such as the firmware.

Note that the given information may be at least one of: acknowledgment information that has been sent to the transfer originator of that packet; speed code information for specifying the speed of data transfer; broadcast information indicating whether or not the packet had been sent to all nodes connected to the bus; information indicating whether or not the packet was received during a self-identification period; and error status information indicating whether or not there was an error in that packet.

The data transfer control device may further comprise: a first bus connected to a next-stage application; a second bus for controlling the data transfer control device; a third bus connected electrically to a physical-layer device; a fourth bus connected electrically to the storage means; and arbitration means for performing arbitration for establishing a data path between any one of the first, second, and third buses and the fourth bus.

This provides mutually separate first, second, and third buses. The arbitration performed by the arbitration means sets up a data path between one of the first, second, and third buses and the fourth bus of the randomly accessible storage means. This arrangement makes it possible to store packets that have been received from another node through a physical-layer device, in any desired disposition within the storage means. In addition, the reading and writing of control information of the packet is done using the second bus, so that the first bus can be used for reading and writing the data in the packets. This enables a reduction in the processing load on the upper layers, such as the transaction layer and application layer. It also makes it possible to utilize low-speed buses as the first and second buses and a low-speed, inexpensive device as the device for controlling the data transfer control device. As a result, the data transfer control device can be made more compact and less expensive.

Note that it is sufficient to connect the first, second, third, and fourth buses electrically to the application, a device for controlling the data transfer control device, physical-layer device, and RAM, respectively, and other devices can exist on these buses.

The data transfer control device may further comprise a FIFO between the packet shaping means and the storage means.

In addition, data transfer may be performed in accordance with the IEEE 1394 standard.

Electronic equipment in accordance with this invention comprises any one of the above described-data transfer control devices; a device for performing given processing on data that has been received from another node through the data transfer control device and the bus; and a device for outputting or storing data that has been subjected to that processing. Another electronic equipment in accordance with this invention comprises: any one of the above described data transfer control devices; a device for performing given processing on data that is to be sent to another node through the data transfer control device and the bus; and a device for fetching data to be subjected to that processing.

According to this invention, it is possible to speed up the processing for outputting or storing data that has been transferred from another node to the electronic equipment, or the processing for transferring data that has been fetched by the electronic equipment to another node. This invention makes it possible to make the data transfer control device more compact and also reduce the processing loads on firmware that controls the data transfer, thus making it possible to produce electronic equipment that is less expensive and more compact.

BRIEF DESCRIPTION OF THE DRAWINGS

FIGS. 1A, 1B, and 1C are illustrative of the concepts of asynchronous transfer and isochronous transfer.

FIGS. 4A, 4B, 4C, and 4D show the formats of various physical-layer packets such as a self-ID packet.

FIG. 15 illustrates tags.

FIG. 24A shows the format of an asynchronous packet in accordance with the IEEE 1394 standard and FIG. 24B shows the format of the header portion of an asynchronous receive packet stored in the header area of RAM.

FIG. 26A shows the format of the header portion when a packet is a self-ID packet and FIG. 26B shows the format of the header portion when a packet is a PHY packet that is not a self-ID packet.

BEST MODE FOR CARRYING OUT THE INVENTION

Preferred embodiments of this invention are described below with reference to the accompanying drawings.

1. IEEE 1394

The description first relates to an outline of IEEE 1394.

1.1 Data Transfer Speed and Connection Topology

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

When power is applied or devices have been disconnected or connected while power is on, a bus reset occurs and all information relating to connection topology is cleared thereby. After the bus reset, tree identification (determination of the root node) and self identification are performed. Subsequently, the nodes that are to act as management nodes, such as the isochronous resource manager, cycle master, and bus manager, are determined. Ordinary packet transfer then starts.

1.2 Transfer Methods

IEEE 1394 provides for asynchronous transfer (suitable for data transfers where reliability is required) and isochronous transfer (suitable for transfers of data such as moving images and audio, where real-time capabilities are required), as packet transfer methods.

An example of an asynchronous subaction is shown in FIG. 1A. One subaction consists of arbitration, packet transfer, and acknowledgment. In other words, data transfer has precedence but first of all arbitration relating to the right of use of the bus takes place. A packet is then transferred from the source node (the originator of the transfer) to the destination node (the destination of the transfer). A source ID and a destination ID are comprised within the header of this packet. The destination node reads this destination ID and determines whether or not the packet is addressed to itself. If the destination node accepts the packet, it sends an acknowledgment (ACK) packet back to the source node.

There is an acknowledgment gap between the packet transfer and the ACK packet. There is also a subaction gap between one subaction and the next subaction. Arbitration for the next subaction cannot occur until a fixed bus idle time that is equivalent to this subaction gap has elapsed. This prevents collisions between subactions.

An example of an isochronous subaction is shown in FIG. 1B. Since an isochronous transfer is performed as a broadcast (transfer to all nodes connected to the bus), no ACK is sent back when a packet is received. With isochronous transfer, packet transfer is performed by using channel numbers, not node IDs. Note that there is an isochronous gap between subactions.

Figure 1C:
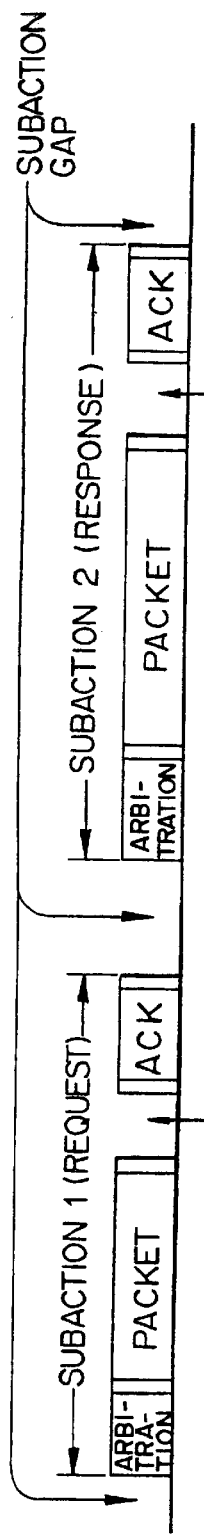
Figure 1C:
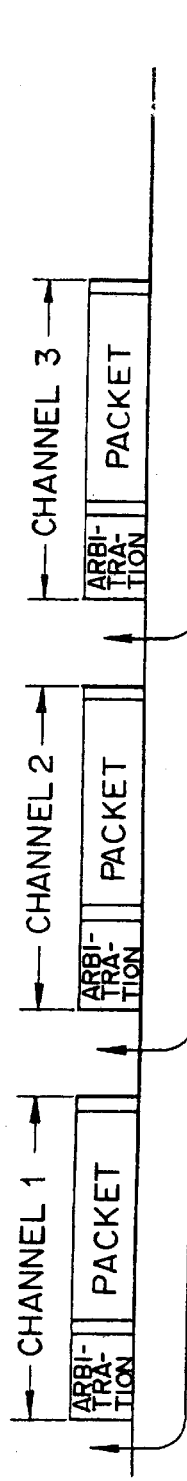
Figure 1C:
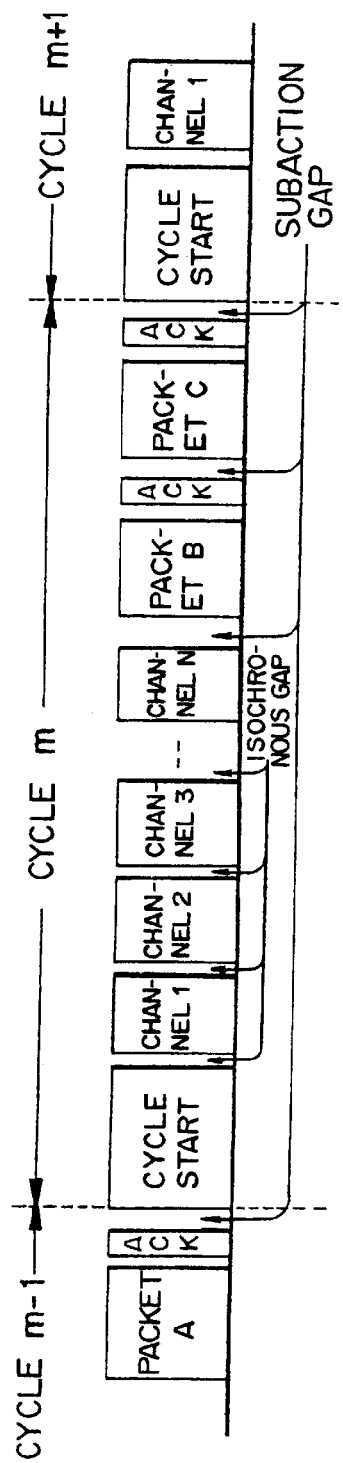

The state of the bus during data transfer is shown in FIG. 1C. Isochronous transfer starts whenever the cycle master generates a cycle start packet at fixed intervals. This enables the transfer of at least one packet every 125 µs, for one channel. This makes it possible to transfer data that requires real-time capabilities, such as moving images or audio.

Asynchronous transfer occurs in intervals between isochronous transfers. In other words, isochronous transfer has a higher priority than asynchronous transfer. This is implemented by making the length of an isochronous gap shorter than the length of a subaction gap during asynchronous transfer, as shown in FIG. 1C.

0.1.3 Tree Identification

Tree identification is performed after a bus reset. During this tree identification, the parent-child relationships between nodes and the root node are determined.

Figure 2A:
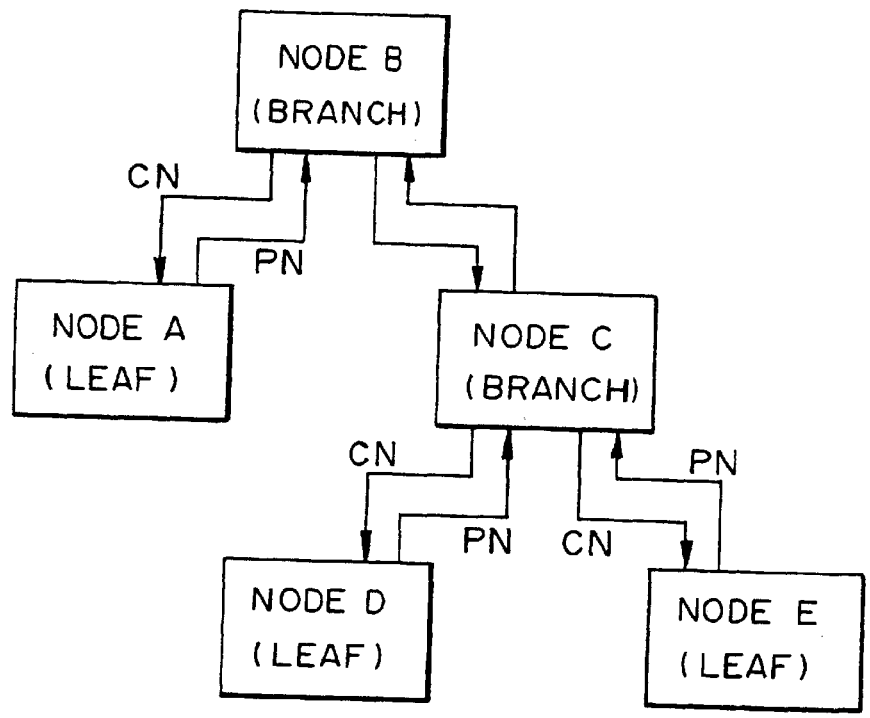
FIGS. 2A and 2B are illustrative of the concept of tree identification.

First of all, each leaf node (a node that is connected to only one other node) sends a "parent-notify" (PN) to the adjacent node. If nodes A, B, C, D, and E are connected as shown in FIG. 2A, by way of example, parent-notify is sent from node A to node B and from nodes D and E to node C.

A node that has accepted a parent-notify recognizes that the originating node is its own child. It then sends a "child-notify" (CN) to that node. In the example shown in FIG. 2A, a child-notify is sent from node B to node A and from node C to nodes D and E. This determines the parent-child relationships between nodes B and A, nodes C and D, and nodes C and E.

Figure 2B:
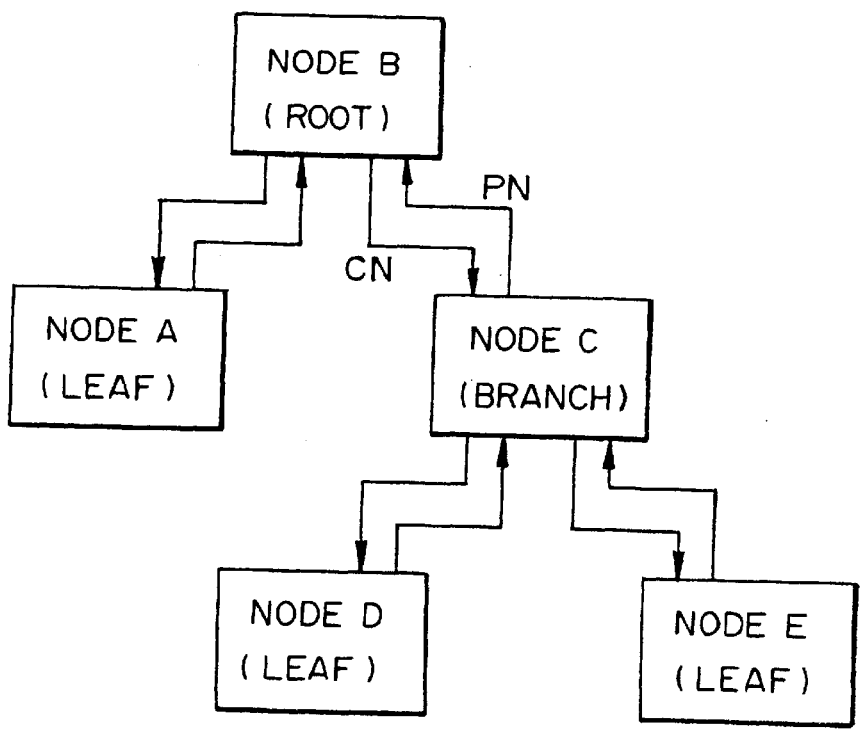

The parent-child relationship between nodes B and C is determined by which of them sends a parent-notify first. If, for example, node C sends the parent-notify first, node B becomes the parent and node C the child, as shown in FIG. 2B.

A node wherein all nodes connected to the ports thereof are own-children becomes the root. In FIG. 2B node B has become the root. Note that IEEE 1394 allows for the possibility of any node becoming the root.

1.4 Self Identification

After tree identification, self identification is performed. During self identification, self-ID packets are transferred in sequence starting from the nodes furthermost from the root node within the connection topology.

Figure 3:
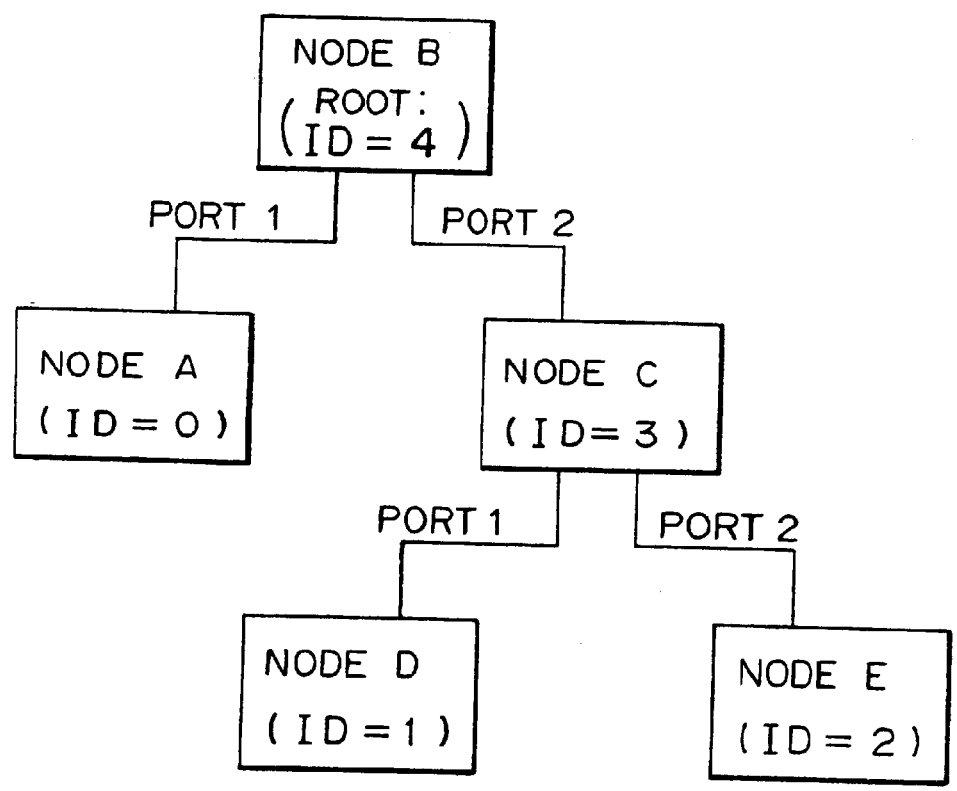
FIG. 3 is illustrative of the concept of self identification.

More specifically, node A, which is connected to port 1 (the port with the smaller number) of the root node B in the configuration shown by way of example in FIG. 3, first broadcasts a self-ID packet (self-identification packet) to all the nodes.

Node C, which is connected to port 2 (the port with the larger number) of the root node B, is then selected and node D, which is connected to port 1 (the port with the smaller number) of node C, broadcasts a self-ID packet. Node E, which is connected to port 2 (the port with the larger number) of node C, then broadcasts a self-ID packet, followed by node C. Finally, node B, which is the root, broadcasts a self-ID packet and self identification is complete.

The ID of each node is comprised within that node's self-ID packet. The ID of that node is the total number of self-ID packets that have been received from other nodes up to the point at which that node broadcasts its own self-ID packet. Taking the example shown in FIG. 3, no node has yet broadcast a self-ID packet at the point at which node A broadcasts, so the ID of node A becomes 0. Node A broadcasts a self-ID packet containing the ID of 0. When node D broadcasts, only node A has issued a self-ID packet. Therefore, the ID of node D becomes 1. In a similar manner, the IDs of nodes E, C, and B become 2, 3, and 4, respectively.

The format of a self-ID packet is shown in FIG. 4A. As shown in this figure, basic information on the nodes is comprised within the self-ID packets. More specifically, information such as the ID of each node (PHY_ID), whether or not the link layer is active (L), the gap-count (gap_cnt), the transfer speed (sp), whether or not the node has the capability of becoming an isochronous resource manager (C), the power state (pwr), and the port states (p0, p1, p2) is comprised therein.

Note that FIG. 4B shows the format of self-ID packets #1, #2, and #3 that are used when a node has 4 or more ports. If a node has between 4 and 11 ports, self-ID packets #0 (FIG. 4A) and #1 are used; if a node has between 12 and 19 ports, self-ID packets #0, #1, and #2 are used; and if a node has between 20 and 27 ports, self-ID packets #0, #1, #2, and #3 are used.

The formats of a link-on packet and a PHY configuration packet, which are physical-layer packets (PHY packets) in a similar manner to the self-ID packets, are shown in FIGS. 4C and 4D.

1.5 Isochronous Resource Manager

The isochronous resource manager (IRM) has the management functions described below.

First of all, it provides the various resources necessary for isochronous transfer. For example, it provides a channel number register and a bandwidth register. Secondly, it provides a register that indicates the ID of the bus manager. Thirdly, it takes on some of the bus management functions if there is no other bus manager.

Of the nodes which have the capability of becoming the IRM (which are capable of managing isochronous resources) and which are also in an operational state (having an active link layer), i.e., of the nodes qualified to become the IRM, the node closest to the root (the node with the largest ID) becomes the IRM. More specifically, of the nodes having self-ID packets (see FIG. 4A) wherein the C (CONTENDER) bit indicating whether or not that node has. IRM capability and the L (LINK_ACTIVE) bit indicating whether or not the link layer is active are both 1, the closest node to the root (the node with the largest PHY_ID) becomes the IRM. If the C bit and L bit of the self-ID packet of the root node are both 1, for example, the root node will become the IRM.

1.6 Cycle Master and Bus Manager

The cycle master has the role of issuing the cycle start packet shown in FIG. 1C, and the root node becomes the cycle master.

The bus manager performs tasks such as creating a topology map (the connection states of all the nodes), creating a speed map, managing power to the bus, determining the cycle master, and optimizing the gap count.

1.7 Protocol Configuration

Figure 5:
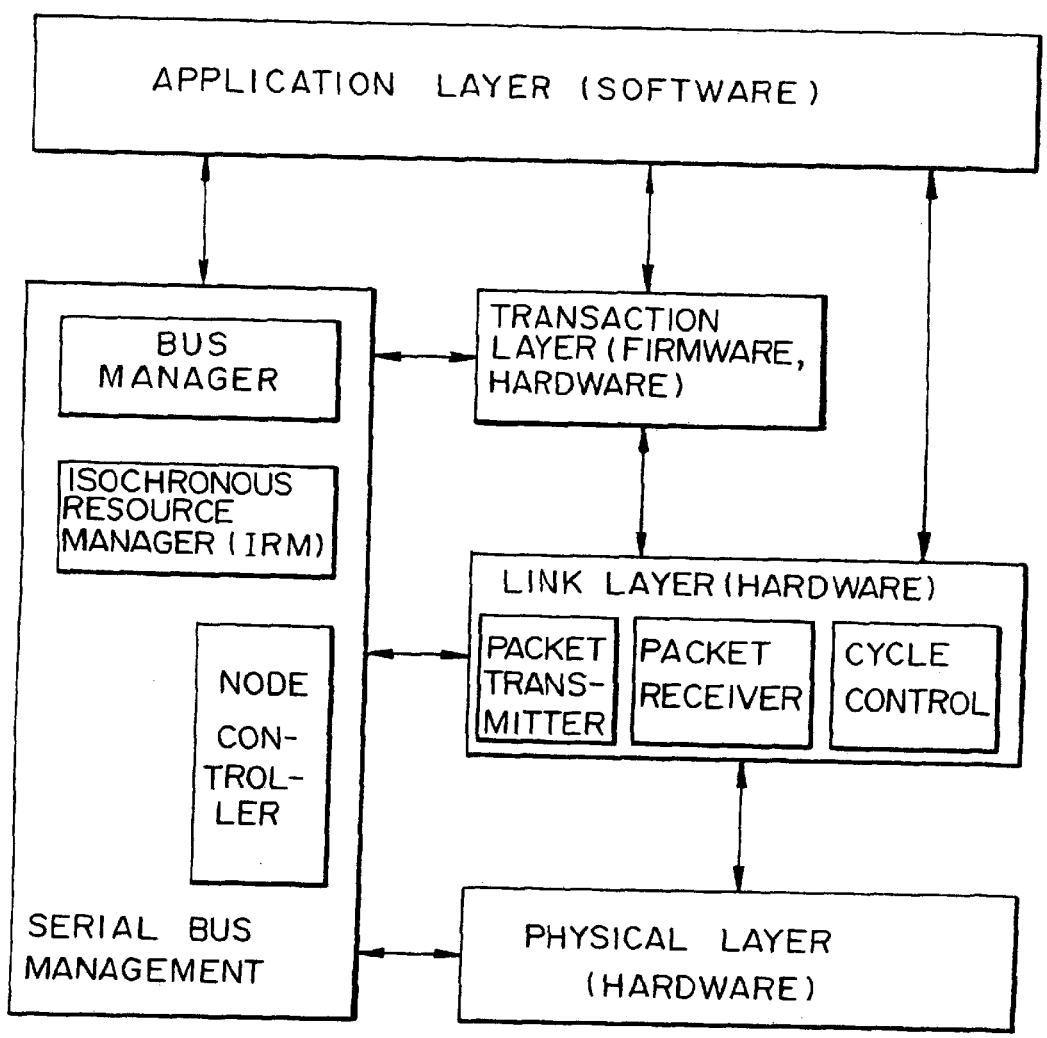
FIG. 5 is illustrative of the IEEE 1394 protocol configuration.

The description now turns to the protocol configuration (layer structure) of IEEE 1394, with reference to FIG. 5.

The IEEE 1394 protocol comprises a physical layer, a link layer, and a transaction layer. The serial bus management function monitors and controls the physical layer, link layer, and transaction layer, and provides various functions for controlling nodes and managing bus resources.

The physical layer converts the logical symbols used by the link layer into electrical signals, performs bus arbitration, and defines the physical bus interface.

The link layer provides functions such as addressing, data check, data framing, and cycle control.

The transaction layer defines the protocol for transactions such as read, write, and lock The physical layer and link layer are usually implemented by hardware such as a data transfer control device (interface chip). The transaction layer is implemented either by firmware operating on the CPU, or hardware.

2. Overall Configuration

The overall configuration of this embodiment is described below, with reference to FIG. 6.

Figure 6:
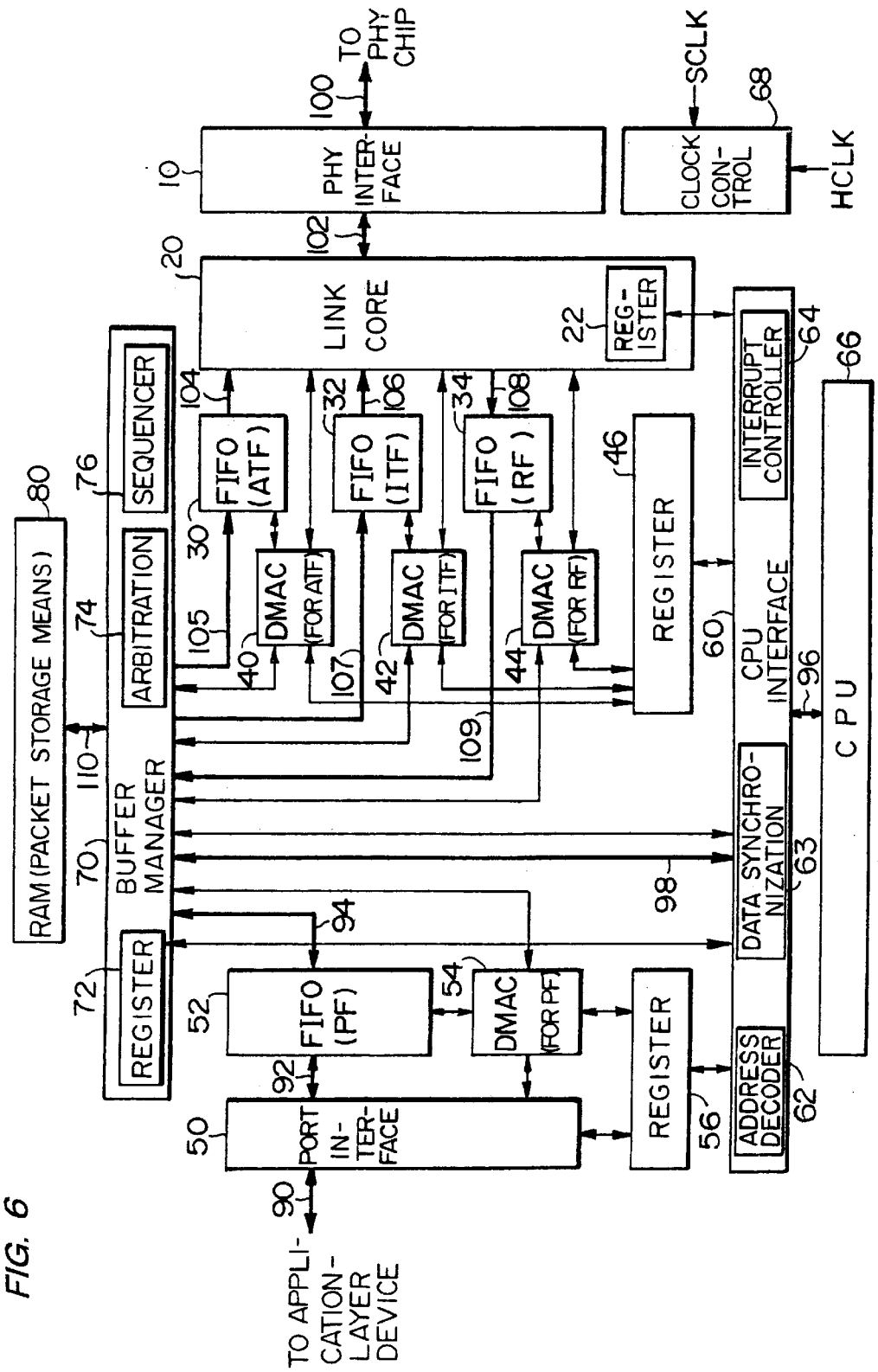
FIG. 6 shows a structural example of the data transfer control device of an embodiment of this invention.

In FIG. 6, a PHY interface 10 is a circuit that provides an interface with a PHY chip that implements the physical-layer protocol.

A link core 20 (link means) is a circuit that implements part of the link layer protocol and the transaction layer protocol; it provides various service relating to packet transfer between nodes. A register 22 is provided to control the link core 20 that implements these protocols.

A FIFO (ATF) 30, FIFO (ITF) 32, and FIFO (RF) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

DMACs 40, 42, and 44 are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as printer drivers, by way of example). In this embodiment of the invention, the use of this port interface 50 makes it possible to transfer 8-bit data, for example.

A FIFO (PF) 52 is a FIFO used for transferring data between an application-layer device and a DMAC 54 is a DMA controller for PF. A register 56 provides control over the port interface 50 and the DMAC 54.

A CPU interface 60 provides an interface with the CPU 66 that controls the data transfer control device. The CPU interface 60 comprises an address decoder 62, a data synchronizer 63, and an interrupt controller 64. A clock controller 68 controls the clock signals used by this embodiment, and an SCLK signal sent from the PHY chip and an HCLK signal that is a master clock are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

Figure 7:
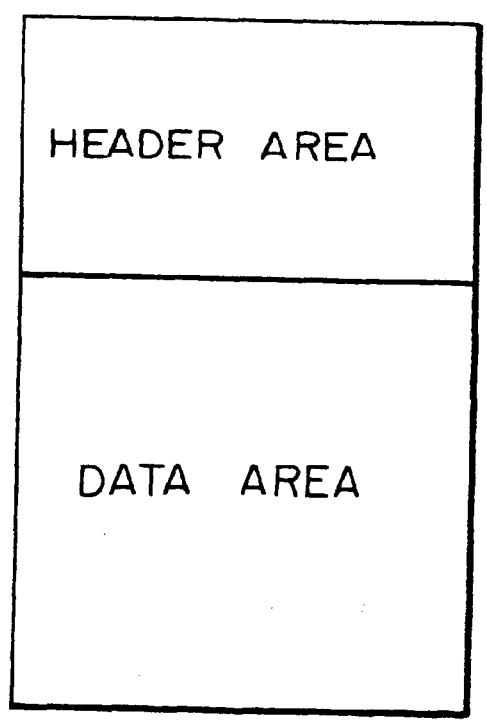
FIG. 7 is illustrative of the separation between the header (control information) area and the data area.

The RAM 80 functions as a randomly accessible packet storage means, where this function is implemented by SRAM or DRAM or the like. In this embodiment of the invention, the RAM 80 is divided into a header area (broadly speaking, a control information area) and a data area, as shown in FIG. 7. The header of a packet (broadly speaking, control information) is stored in the header area of FIG. 7, and the data of the packet is stored in the data area thereof.

Note that the RAM 80 is preferably accommodated within the data transfer control device of this embodiment. However, it is possible to attach part or all of the RAM 80 externally.

A bus 90 (or buses 92 and 94) is for connections to applications, as a first bus. Another bus 96 (or bus 98) is for controlling the data transfer control device, as a second bus, which is connected electrically to a device (such as a CPU) that controls the data transfer control device. Yet another bus 100 (or buses 102, 104, 105, 106, 107, 108, and 109) is for electrical connections to physical-layer devices (such as the PHY chip), as a third bus. A further bus 110 (a fourth bus) is for electrical connections to RAM that acts as a randomly accessible storage means.

The arbitration circuit 74 in the buffer manager 70 arbitrates bus access requests from the DMAC 40, the DMAC 42, the DMAC 44, the CPU interface 60, and the DMAC 54. Based on the results of this arbitration, a data path is established between one of the buses 105, 107, 109, 98, and 94 and the bus 110 of the RAM 80 (i.e., a data path is established between one of the first, second, and third buses and the fourth bus).

One feature of this embodiment is the way in which it is provided with the RAM 80, which stores packets in a randomly accessible manner, and also the mutually independent buses 90, 96, and 100 as well as the arbitration circuit 74 for connecting one of those buses to the bus 110 of the RAM 80.

Figure 8:
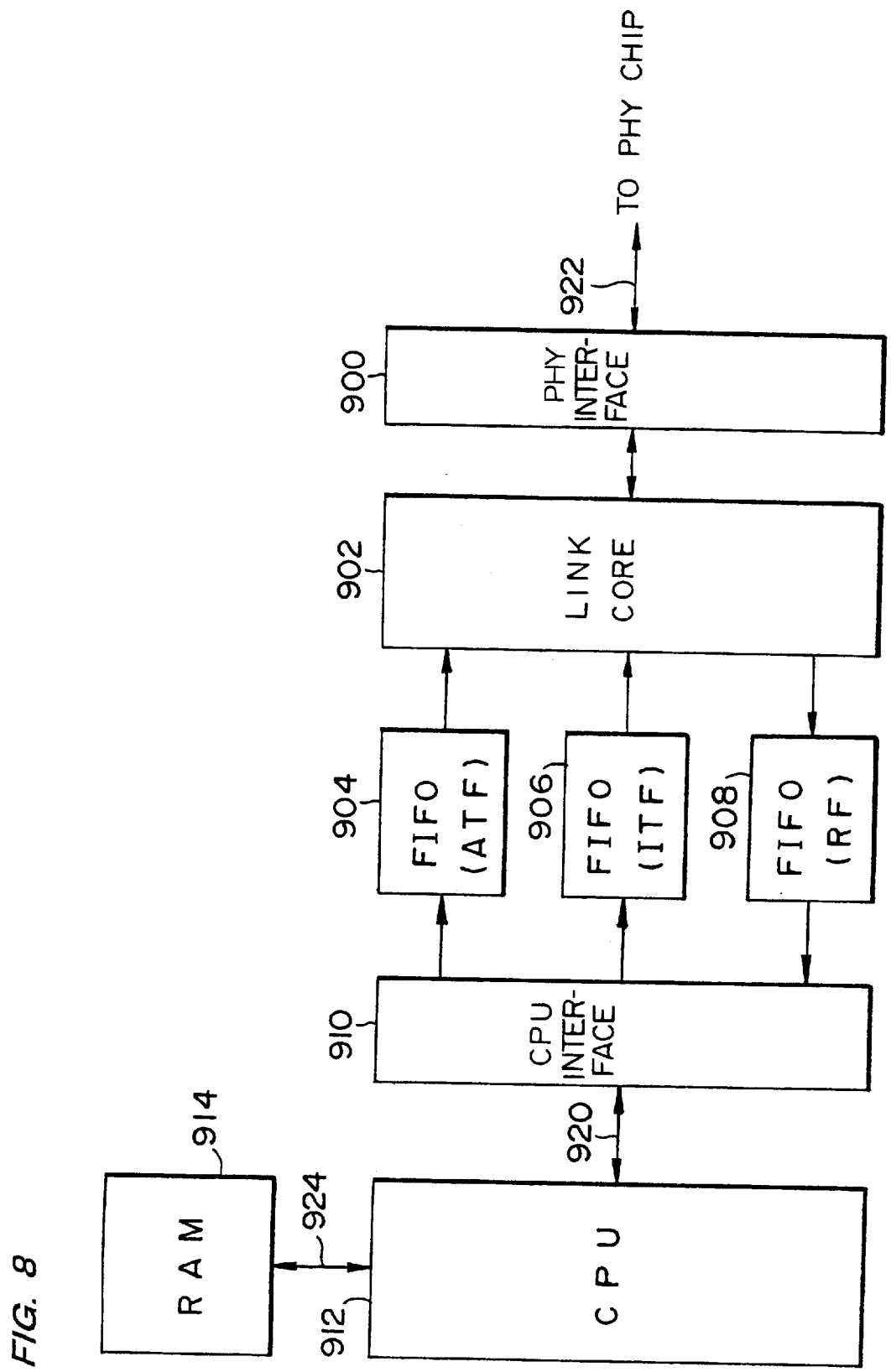
FIG. 8 shows the structure of a comparative example for this embodiment.

A data transfer control device that has a different configuration from that of this embodiment is shown in FIG. 8, by way of example. In this data transfer control device, a link core 902 is connected to a PHY chip by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory in the CPU, by a-bus 924.

Note that the FIFOs 904, 906, and 908 differ from the FIFOs 30, 32, and 34 of FIG. 6 in that they each have an extremely large number of stages (such as 16 stages per FIFO).

Figure 9:
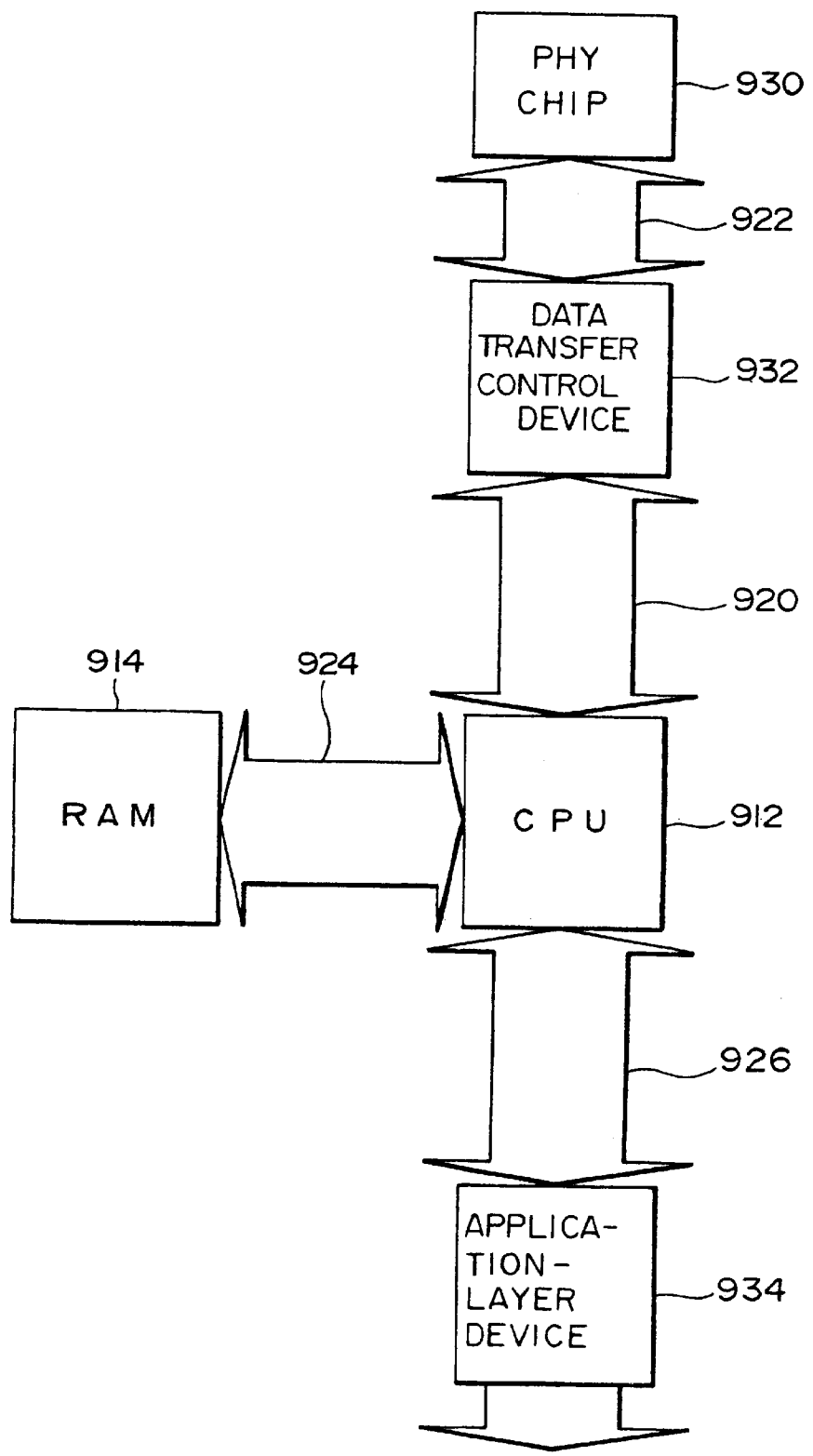
FIG. 9 is illustrative of the method of data transfer used by the configuration of FIG. 8.

The method of data transfer used with the data transfer control device configured as shown in FIG. 8 will now be described with reference to FIG. 9. A receive packet sent from another node through a PHY chip 930 passes through the bus 922, a data transfer control device 932, and the bus 920, then is accepted by the CPU 912. The CPU 912 writes the accepted receive packet to the RAM 914 over the bus 924. The CPU 912 processes the receive packet into a form that can be used by the application layer, then transfers it to an application-layer device 934 over a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node over the path comprising the data transfer control device 932 and the PHY chip 930.

However, if this data transfer method is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

Figure 10:
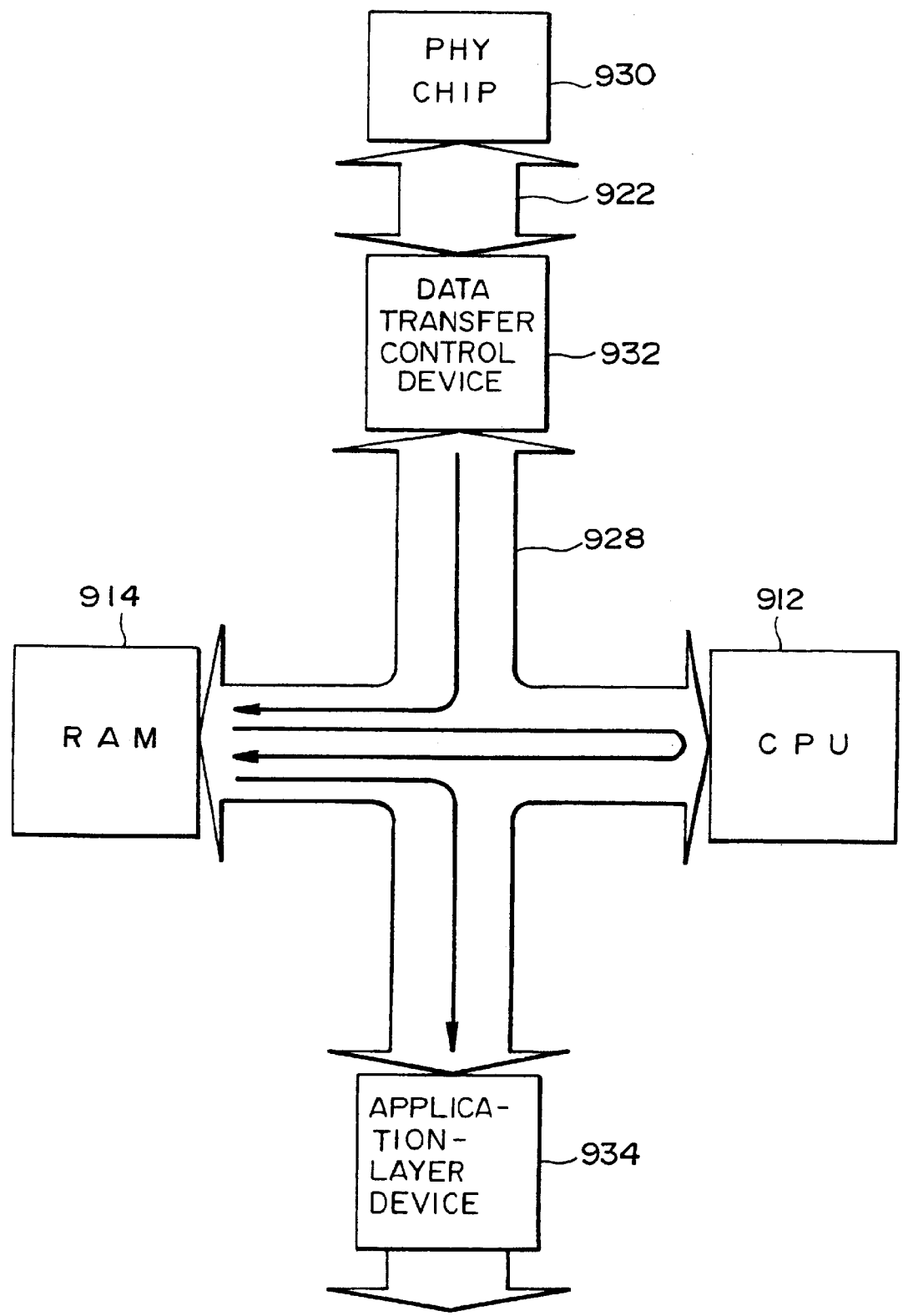
FIG. 10 is illustrative of another method of data transfer.

One method that can be considered for solving this problem uses hardware DMA to implement data transfer between the data transfer control device 932 and the RAM 914 and data transfer between the RAM 914 and the application-layer device 934, as shown in FIG. 10.

With this method, however, a CPU bus 928 must be used for data transfers between the data transfer control device 932 and the RAM 914, between the RAM 914 and the CPU 912, and between the RAM 914 and the application-layer device 934. This means that if an attempt is made to increase the speed of data transfers within the entire system, a high-speed bus such as a PCI bus must be used as the CPU bus 928, leading to an increase in the cost of electronic equipment that uses this data transfer control device.

Figure 11:
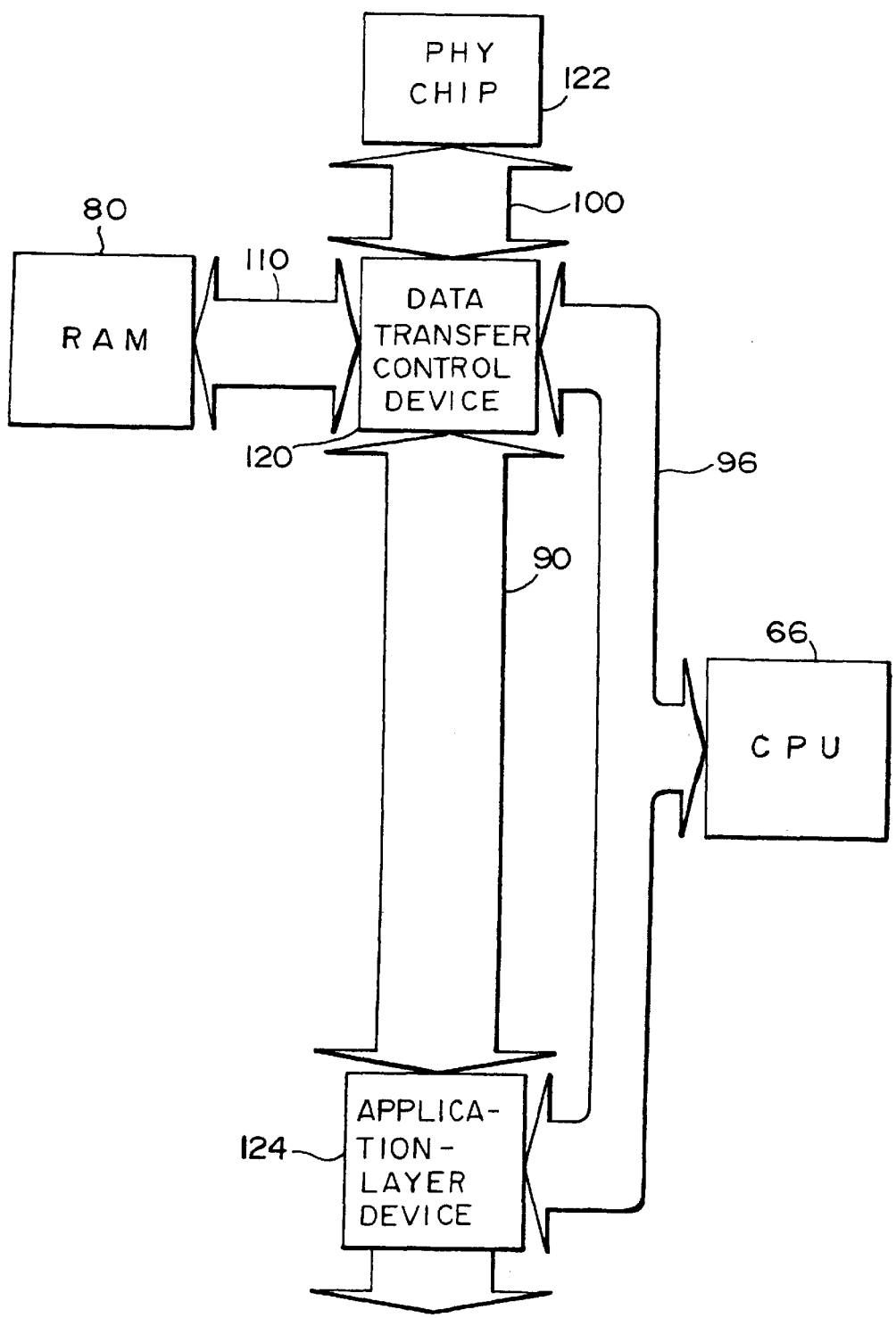
FIG. 11 is illustrative of the method of data transfer used by this embodiment of the invention.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 11. The configuration is therefore such that the CPU bus 96 can be used solely for controlling data transfer. In addition, the bus 90 is dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Receive Packet Format 3.1 Features of this Embodiment

In this embodiment of the invention, the storage area in the RAM 80 is divided into a header area (broadly speaking, a control information area) in which is stored packet headers (broadly speaking, control information) and a data area in which is stored packet data, as shown in FIG. 7.

In the comparative example shown by way of example in FIG. 8, the CPU 912 has to accept receive packets from the FIFOs 904 and 906 in the sequence in which they were received. Therefore, if an attempt is made to separate the header and data of each receive packet, the CPU 912 first has to write the receive packet that has been read out from the FIFO 908 temporarily to the RAM 914, which is local memory, then read the receive packet from that RAM 914 in order to separate the header and the data. Thus the processing load on the CPU 912 is extremely large, which will eventually lead to a deterioration in the actual transfer speed of the entire system.

Figure 12:
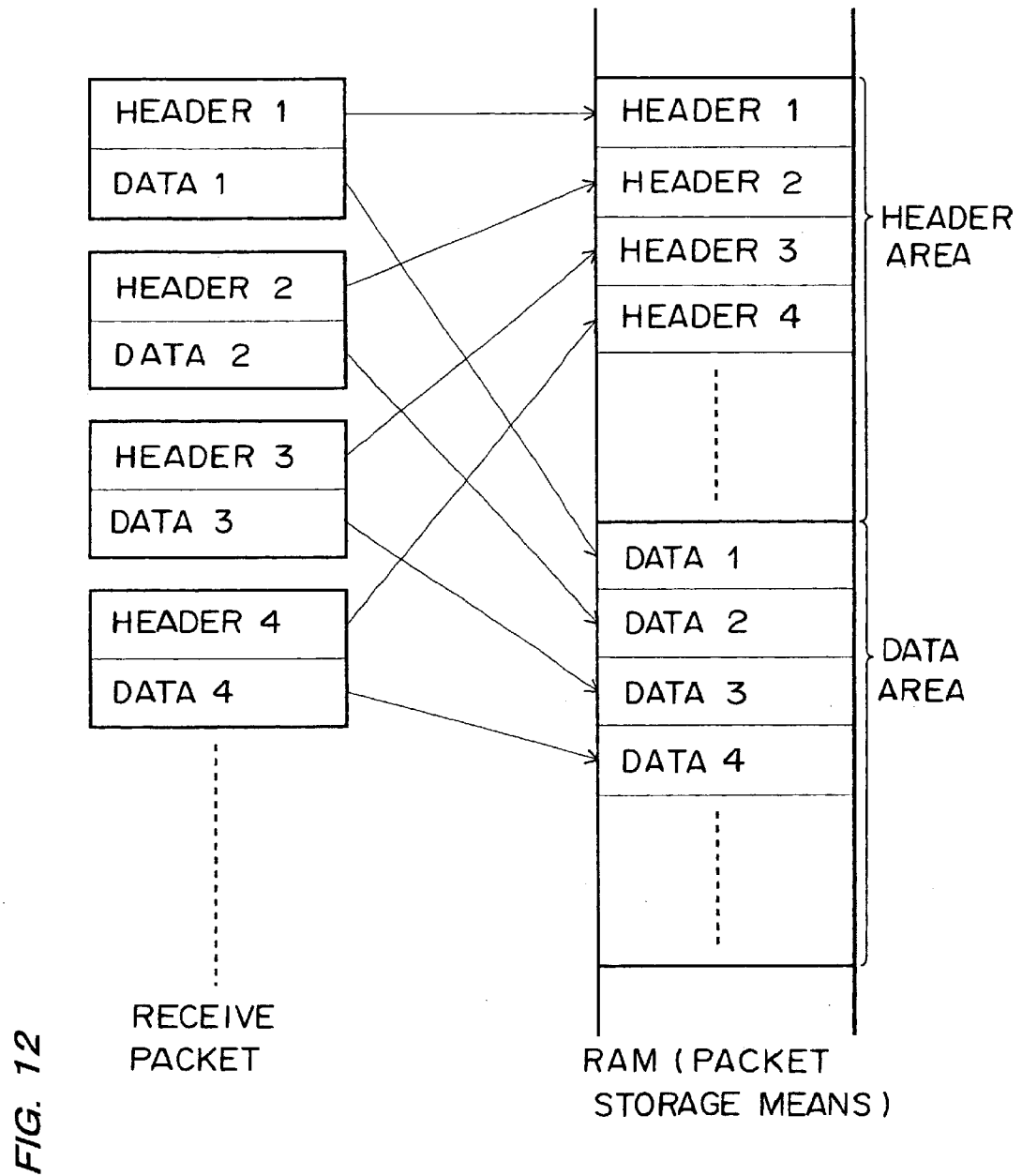
FIG. 12 is illustrative of a method in which the header and data of a receive packet are separated and are stored in a header area and data area in RAM.

In contrast thereto, the storage area of the RAM 80 in the embodiment shown in FIG. 6 is divided into a header area and a data area. More specifically, the header and data of each receive packet are divided by the hardware, with the header being stored in the header area and the data being stored in the data area, as shown in FIG. 12. This ensures that the processing load on the CPU 66 is extremely small in comparison with the configuration of FIG. 8, which can improve the actual transfer speed of the entire system. In addition, since it is possible to employ an inexpensive device as the CPU 66 and it is also sufficient to use a low-speed bus for connection to the CPU 66, the data transfer control device and electronic equipment can be made more compact, at a lower cost.

With this embodiment of the invention, headers are stored together in the header area and data is stored together in the data area. It is therefore possible to simplify the read and write processing of headers and data, enabling a reduction in processing overheads. Taking data transfer by the method of FIG. 11 by way of example, the data transfer can be controlled by having the CPU 66 access only the header area through the CPU bus 96, to read and write headers. The application-layer device 124 can also read out the data continuously from the data area over the bus 90, and also write data continuously to the data area.

Figure 13:
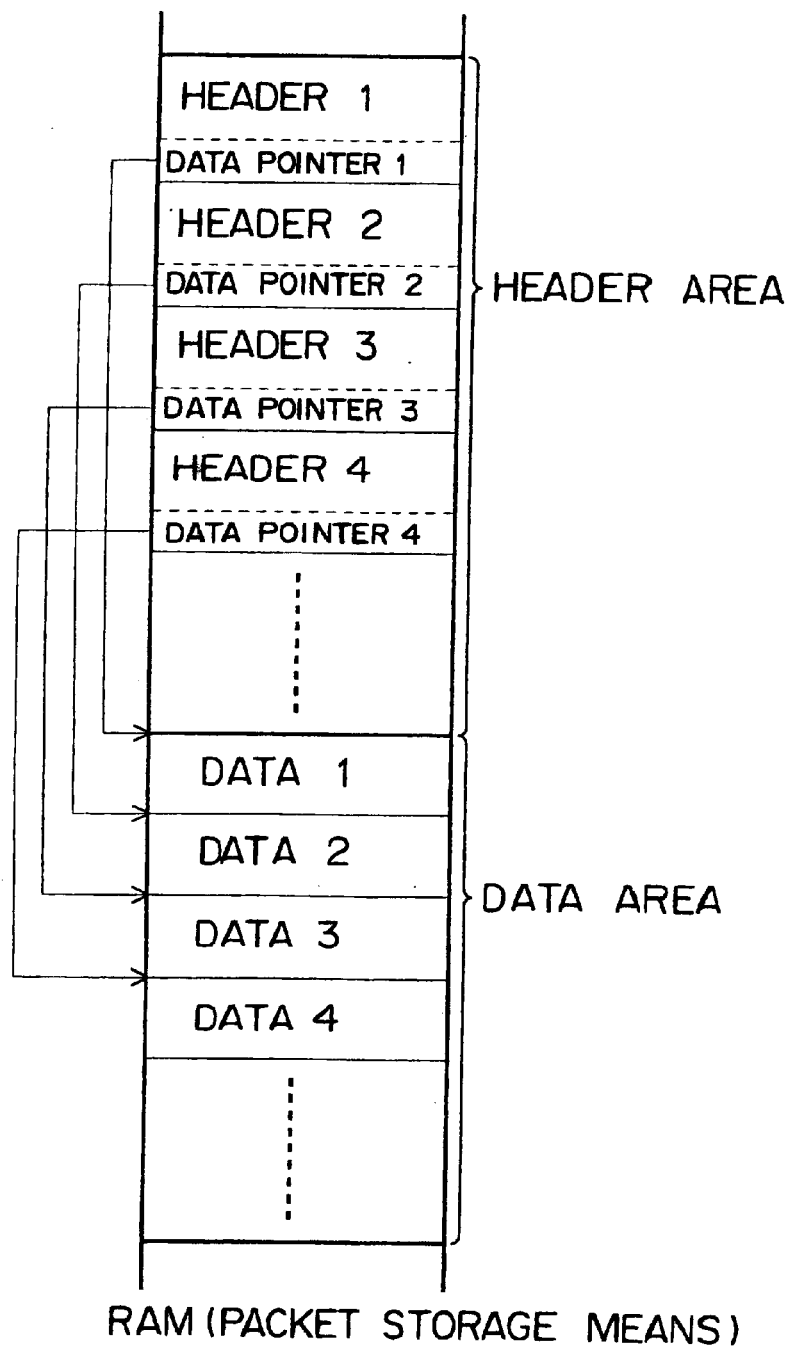
FIG. 13 is illustrative of a method in which a data pointer is comprised within a header stored in the header area.

In this embodiment of the invention, each header stored in the header area is made to correspond to data stored in the data area, by a data pointer comprised within the header, as shown in FIG. 13. The attachment of this data pointer is implemented as described below.

Figure 14:
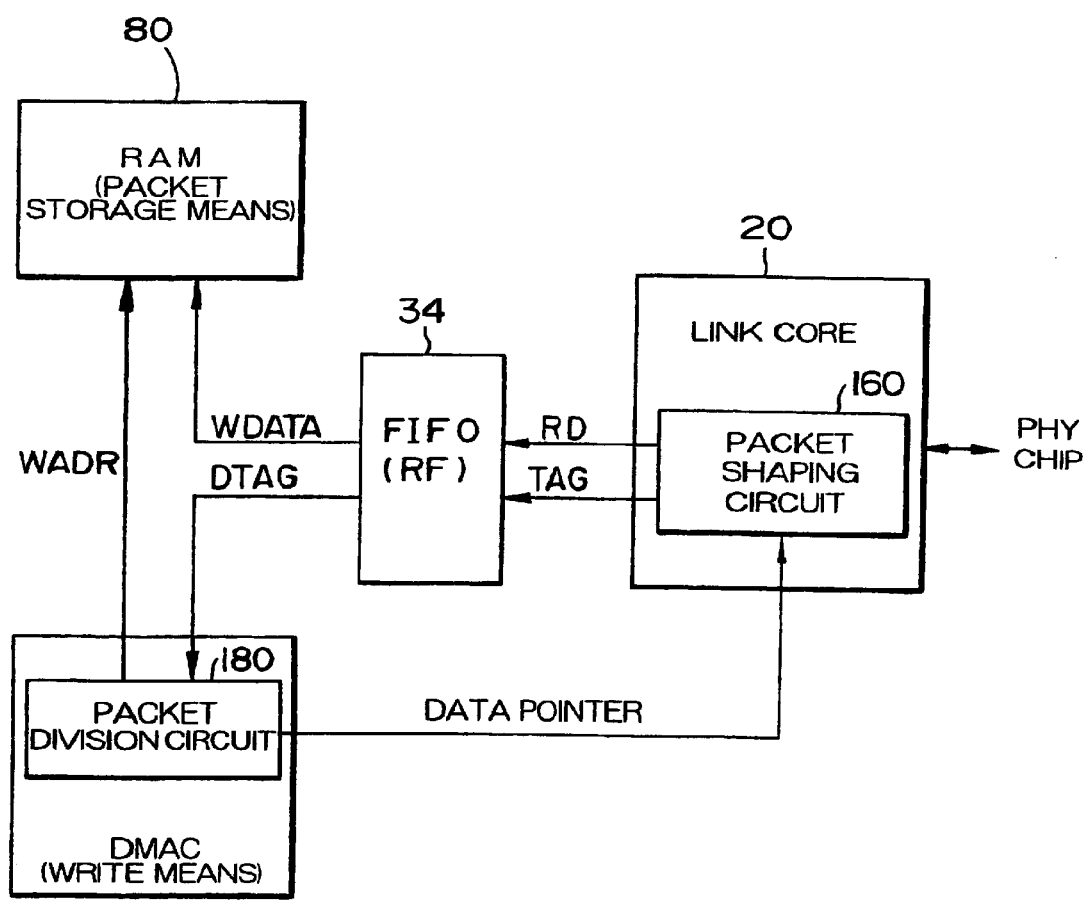
FIG. 14 is illustrative of a method by which a packet shaping circuit takes a data pointer that has been transferred by the packet division circuit and appending that data pointer to the header of a packet.

In other words, the link core 20 of this embodiment of the invention comprises a packet shaping(reforming) circuit 160, and the DMAC 44 (broadly speaking, write means) comprises a packet division circuit 180, as shown in FIG. 14. In this case, the packet shaping circuit 160 shapes each packet that has been transferred in from another node, into a form that can be used by an upper layer, such as the transaction layer or the application-layer. The packet division circuit 180 divides each packet then performs processing for writing the header and trailer (footer) of that packet to the header area of the RAM 80 and the data of the packet to the data area of the RAM 80.

The packet division circuit 180 passes to the packet shaping circuit 160 a data pointer indicating the address (start address) of data written to the data area. The packet shaping(reforming) circuit 160 that has received the data pointer then appends (embeds) that data pointer to the header of the packet. The header to which the data pointer has been appended is stored in the header area shown in FIG. 13 and the data indicated by that data pointer is stored in the data area. In this case, the write address WADR of the header and data is generated by the packet division circuit 180.

This configuration makes it possible for the firmware or the like, which reads a header from the header area, to easily determine the storage address within the data area of the data that corresponds to that header. In addition, the data pointer is appended by the packet shaping circuit 160, so it is not necessary for the DMAC 44 (the packet division circuit 180) to participate therein. The DMAC 44 can therefore concentrate on writing data to the RAM 80, which simplifies the circuit configuration and processing of the DMAC 44.

In this embodiment of the invention, the tags shown in FIG. 15 are created for distinguishing between the start (top of the header), header, data, and trailer of each receive packet, and these tags are linked to the receive packet. More specifically, when the link core 20 transfers the start (the top of the header), header, data, and trailer of a receive packet to the FIFO 34, it simultaneously outputs the 2-bit tags shown in FIG. 15 to the FIFO 34. In this embodiment, these tags that have been linked to each receive packet are used to separate the header and data of the receive packet and store them in the header area and the data area, respectively, as shown in FIG. 12. More specifically, the packet division circuit 180 of the DMAC 44 determines the DTAG codes (tags) that are output from the FIFO 34 together with the receive packet, to separate the header and the data of the receive packet and write them to the RAM 80, based on the result. Note that the tags can be anything that distinguishes at least the header and the data.

An example of a method that separates the header and data of a receive packet, without using tags, is a method that uses a tcode (transaction code) within each header. In other words, the tcode is decoded to check the size of the header, a portion of the receive packet correspond to that size is stored in the header area, and the remainder is stored in the data area.

However, this method necessitates a circuit for decoding the tcode, so the circuitry becomes larger.

If tags are used instead, the DMAC 44 can separate the header and the data of a receive packet by simply looking at the tags. It is therefore possible to separate the header and data of each receive packet by a simple process, without increasing the size of the circuitry by much.

Figure 16:
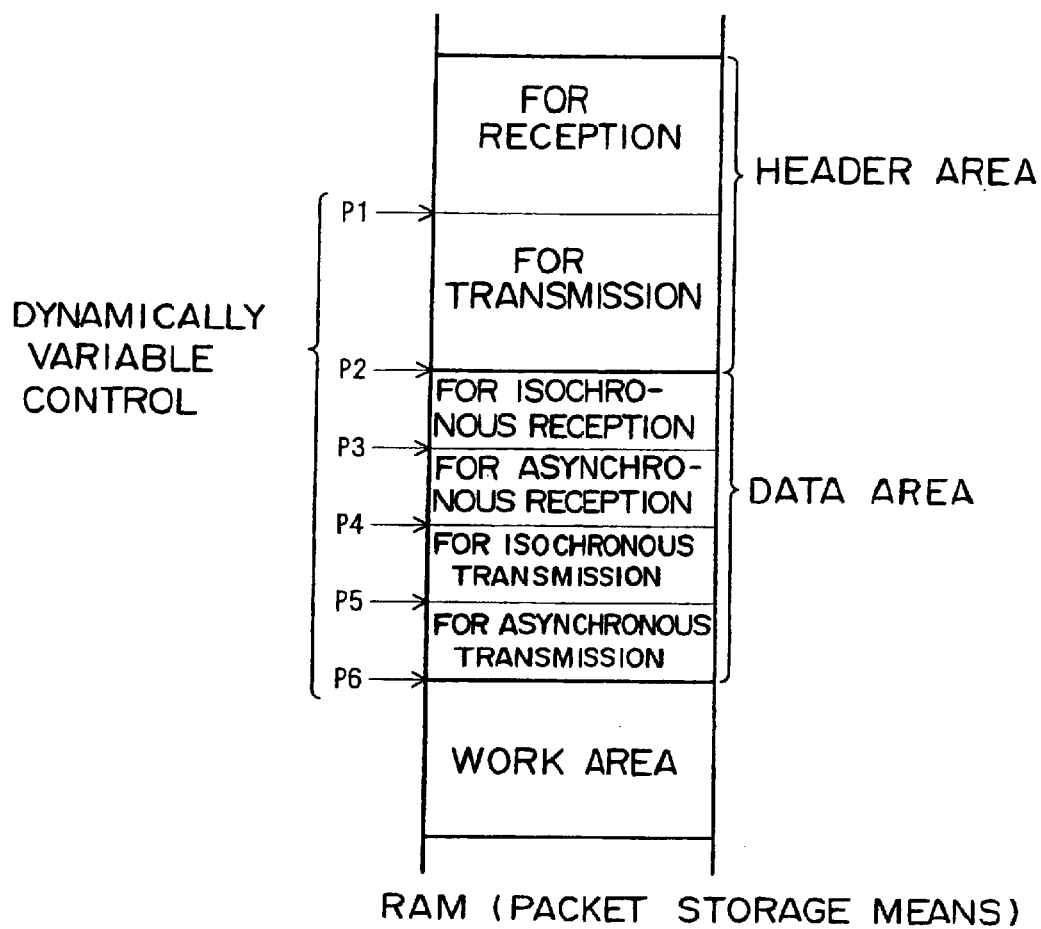
FIG. 16 is illustrative of a method of controlling the size of each area in RAM in a variable manner.

Note that the header area of the RAM 80 of this embodiment is preferably divided into separate areas for reception and transmission, as shown in FIG. 16. Similarly, the data area could be divided into areas for reception and transmission, as well as areas for isochronous transfer and asynchronous transfer. In addition to the header area and the data area, it is also preferable to provide a work area for the CPU 66 that is separated from those areas.

If the storage area of the RAM 80 is divided into a plurality of areas, moreover, it is preferable that the size of each area can be controlled in a variable manner. More specifically, pointers P1 to P6 that indicate the addresses of the boundaries of the areas can be controlled in a variable manner, as shown in FIG. 16. This makes it possible to implement the optimal area partitioning for each application. In this case, it is preferable that the size of each area in the RAM 80 can be controlled dynamically and in a variable manner after the power has been switched on. This makes it possible to increase the area for reception during reception processing or increase the area for transmission during transmission processing, thus making it possible to utilize limited resources efficiently.

Figure 17A:
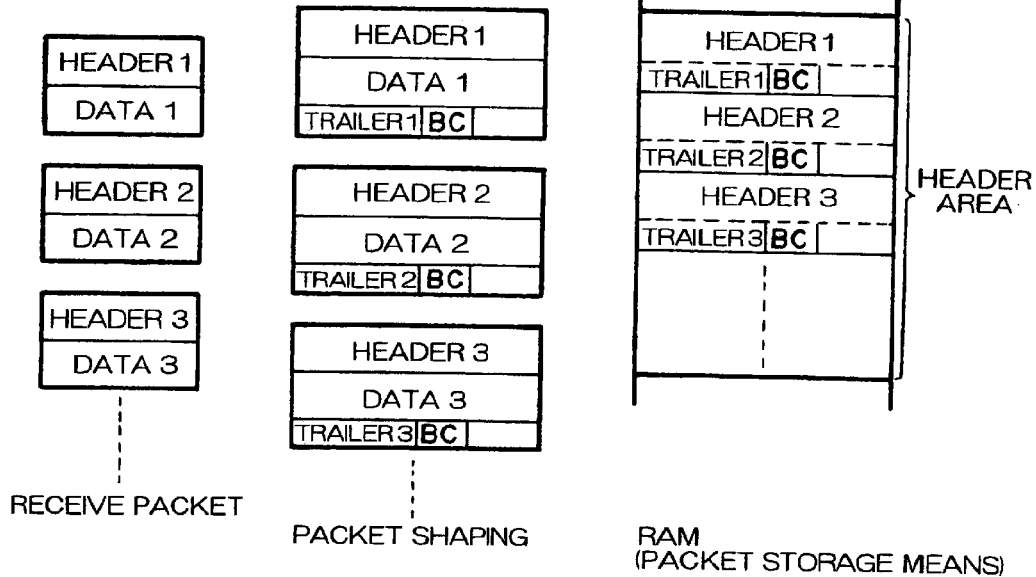
FIGS. 17A, 17B, 17C, and 17D are each illustrative of a method of appending broadcast information to a packet trailer.

With this embodiment of the invention, BC (broadly speaking, broadcast information), which indicates whether or not the packet has been sent to all nodes connected to the bus, is appended to part of the packet, such as the trailer (broadly speaking, control information), during the packet shaping, as shown in FIG. 17A.

Figure 17B:

In other words, asynchronous transfer in accordance with IEEE 1394 involves a 16-bit destination ID (DestID) associated with the packet, for specifying the node that is the transfer destination thereof. The configuration is such that the link core (link layer) does not inform the upper layer such as the firmware (the transaction layer) if the packet is addressed to another node, as shown in FIG. 17B. This makes it possible to prevent unnecessary processing of the firmware, such as decoding of the 16-bit DestID.

If the DestID comprised within a packet is 0x3F, however, that packet has been broadcast to all the nodes. Therefore, the link core does transfer that packet to the upper layer. The firmware must therefore decode the DestID of that packet eventually, to determine whether or not it has been broadcast.

Figure 17C:
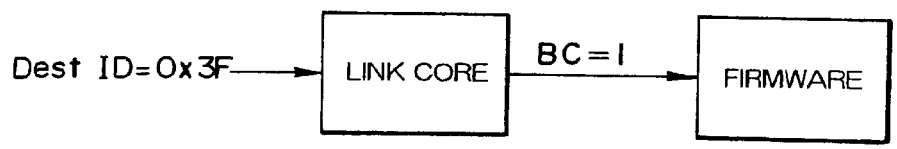
Figure 17D:

If the DestID is 0x3F, the broadcast information BC is set to 1 in accordance with this embodiment of the invention, as shown in FIG. 17C. If the DestID is not 0x3F, on the other hand, BC is set to 0, as shown in FIG. 17D. This configuration makes it possible to determine whether or not a packet had been broadcast, simply by checking the value of the 1-bit BC. In other words, the firmware can determine whether or not the packet has been broadcast, without having to decode the 16-bit DestID. This means that the firmware does not need to decode DestID, which can reduce the processing load on the firmware. As a result, the actual transfer speed of the entire system can be improved.

Figure 18A:
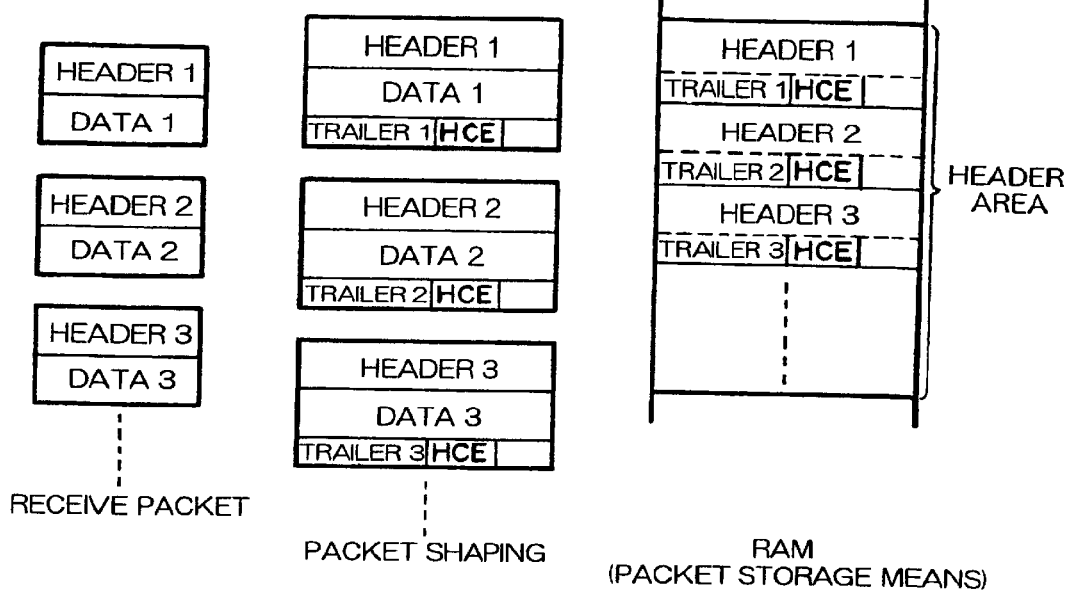
FIGS. 18A and 18B are illustrative of a method of appending error status information to the trailer of a packet, and also of invalidating data in RAM if there is an error in the packet.

This embodiment of the invention appends HCE, which indicates whether or not there is an error in the header or other part of the packet (broadly speaking, error status information), to another part of the packet such as the trailer (broadly speaking, control information) during the packet shaping, as shown in FIG. 18A.

This arrangement makes it possible for the firmware to determine whether or not there was an error in that packet, simply by checking the value of the 1-bit HCE. In other words, the firmware can determine whether or not there was an error in that packet, without having to decode the 32-bit header CRC. As a result, the processing load on the firmware can be reduced, enabling an improvement in the actual transfer speed of the entire system.

Figure 18B:
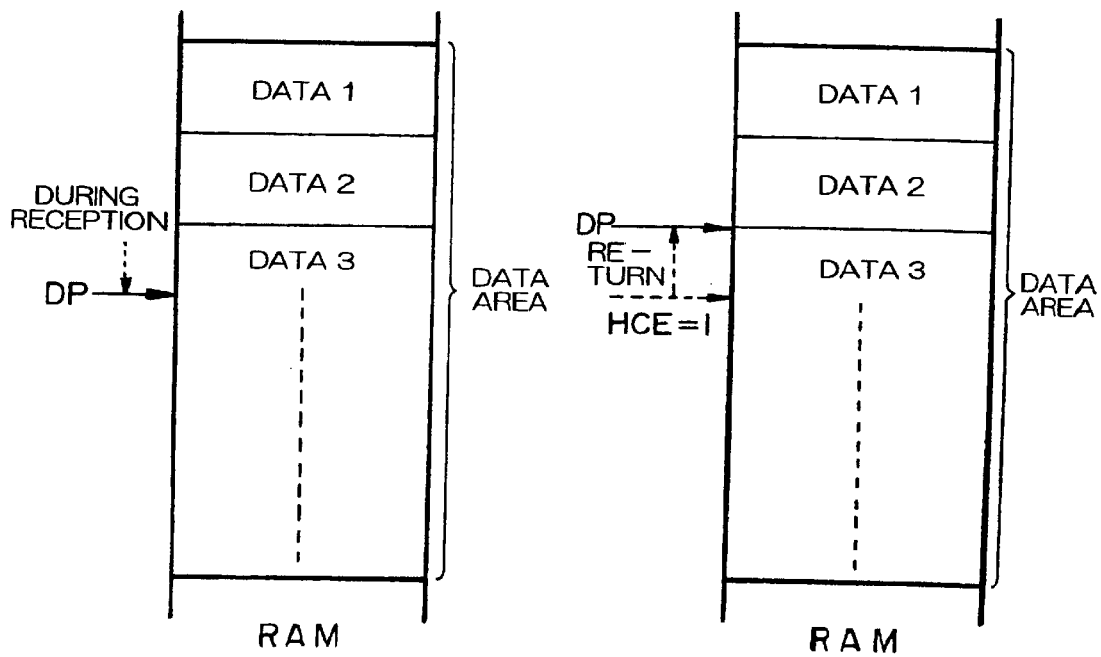

Note that it is preferable to invalidate the data of a packet that is written into the data area, if it is determined that there is an error in that packet. More specifically, if it is determined that there is an error in a packet that comprises data 3 (if HCE=1) in FIG. 18B; the data pointer DP returns to the start address of the area in which data 3 is stored. This makes it possible to retain the continuity of data in the data area. In other words, it becomes possible to continuously store only correct data in the data area, thus enabling the application software to read only correct data in sequence from the data area. In addition, the firmware can know from HCE whether or not there was an error in a packet, so that the firmware can request that the appropriate node retransmits that packet. The thus-configured embodiment of this invention makes it possible to reduce the processing load on the firmware and application software, enabling an improvement in the actual transfer speed of the entire system.

Note that any other error, such as a data CRC error, could be considered as error status information instead of a header CRC error.

Figure 19:
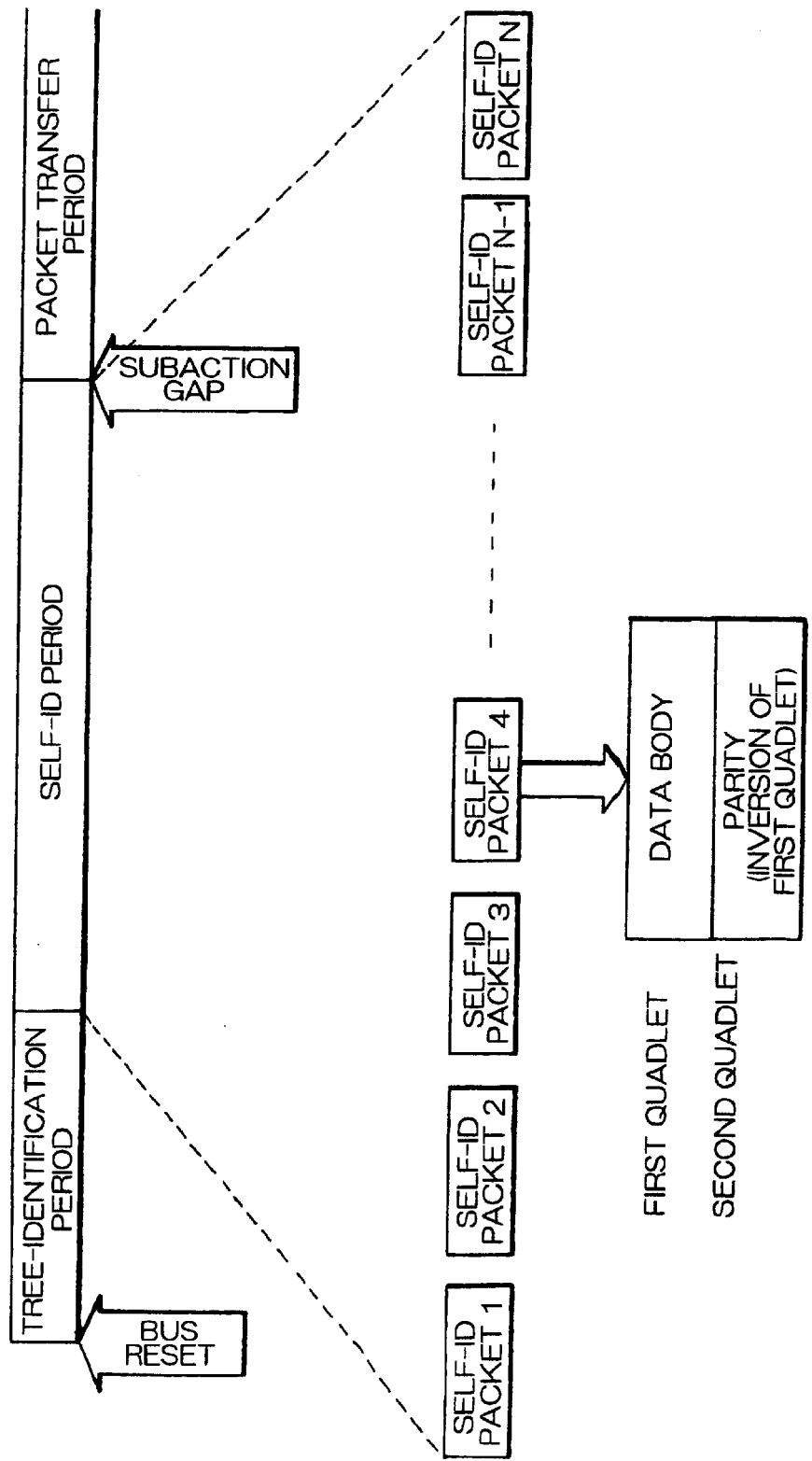
FIG. 19 is illustrative of the self-ID period.

During a self-ID period, self-ID packets are sent in from all the nodes connected to the bus, as shown in FIG. 19. The first quadlet of each self-ID packet forms the data itself (body), comprising basic information such as the node ID, and the second quadlet is parity information (error check information) that is the inverse of the first quadlet (for details, see FIG. 4A).

Figure 20A:
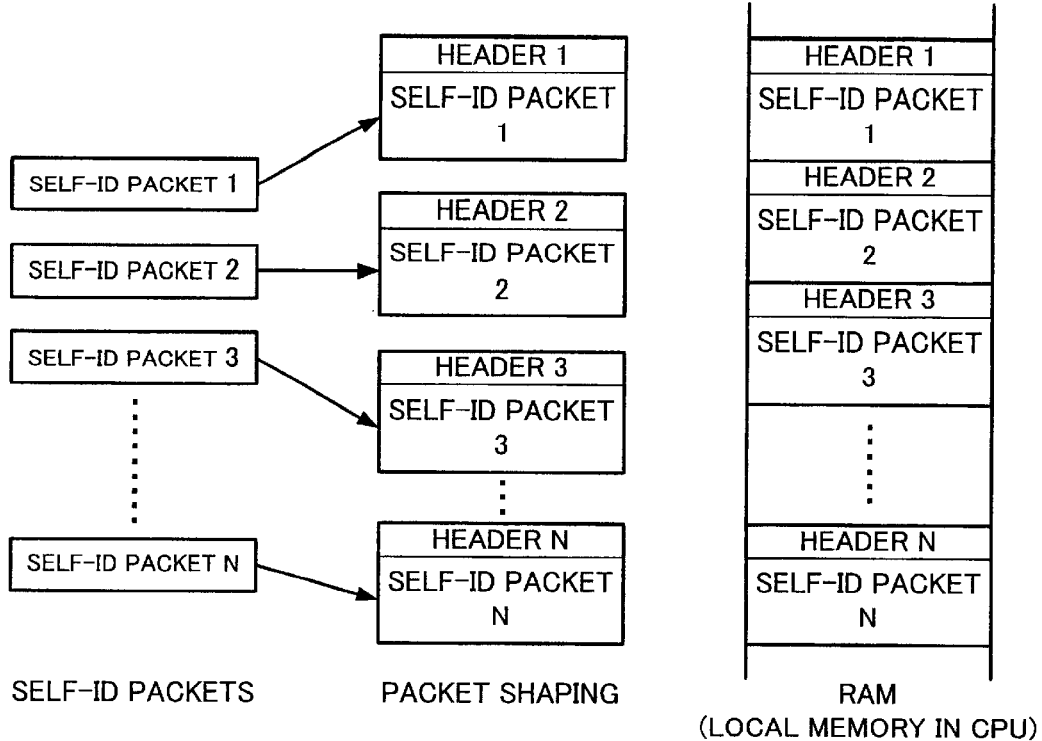
FIGS. 20A and 20B are illustrative of a method of taking information indicating whether or not a packet was received during the self-ID period and appending that information to the trailer of a packet.

With a data transfer control device of the configuration shown in FIG. 8, by way of example, a series of self-ID packets is shaped as shown in FIG. 20A. In other words, each self-ID packet, which is a physical-layer packet, is shaped by the attachment of a header that provides an interface with an upper layer (transaction layer or application layer). The thus-shaped packet is stored in the RAM 914, which is local memory for the CPU 912.

However, it is necessary to have the same number of self-ID packets as the number of nodes, so that if there are 63 nodes connected to the bus, a minimum of 63 self-ID packets must be retained, by way of example. In other words, there is usually an extremely number of self-ID packets. If a header is appended to each self-ID packet and the resultant packets are stored as is in RAM, therefore, the free RAM capacity will be reduced and it will not be possible to use the resources of each node efficiently. In addition, the firmware has to perform the necessary processing for the acceptance of every one of these self-ID packets. Therefore, if the number of self-ID packets increases, the processing load on the firmware will also increase. Furthermore, the work of shaping these accepted self-ID packets must be done after the self-ID period has ended, in other words, after a bus reset has occurred then an initial arbitration reset gap has occurred. Therefore, if the number of self-ID packets increases, the processing load involved with shaping those packets will also increase.

Figure 20B:
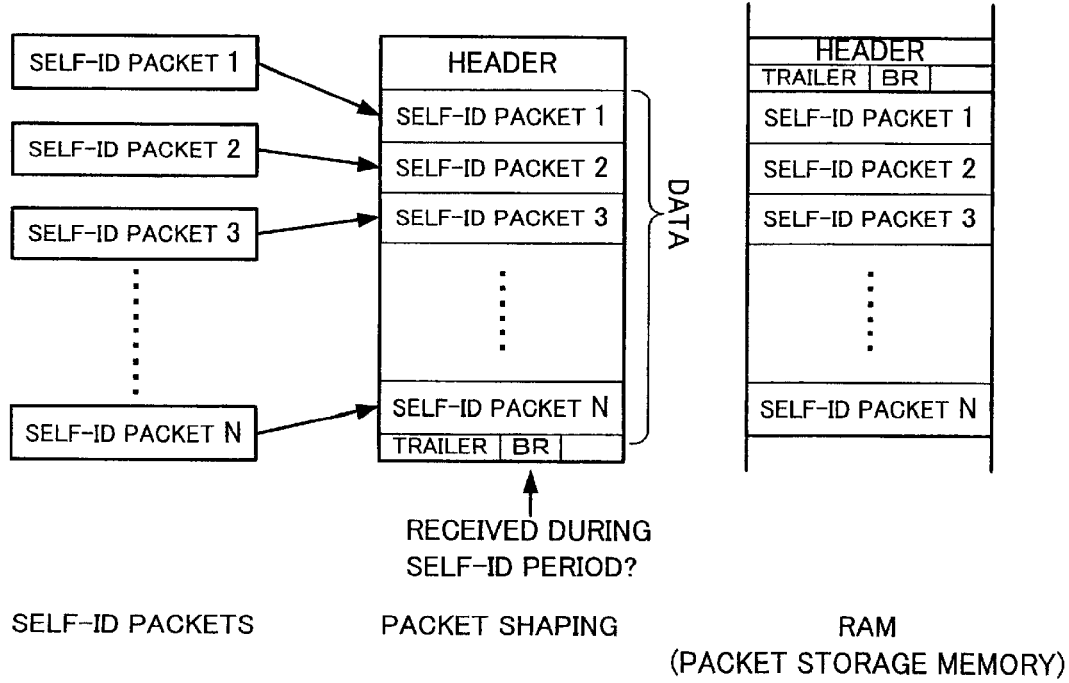

With this embodiment of the invention, a series of packets that are sent in is shaped into a packet having a frame made up of a header (broadly speaking, control information) and data from that series of self-ID packets, as shown in FIG. 20B. In other words, the series of self-ID packets is re-packaged into a single packet and one header is appended to that re-packaged packet, to form an interface with upper layers.

This configuration succeeds in effectively eliminating the situation by which the free capacity of the RAM (the RAM 80 of FIG. 6), which is the packet storage means, is reduced.

In addition, this embodiment of the invention ensures that only one re-packaged packet is used, even if there are N self-ID packets. It is therefore sufficient to perform only one packet read, in order to read that re-packaged packet into RAM. This means that the processing load on the firmware can be dramatically reduced.

In addition, this embodiment of the invention appends BR, which is status information indicating whether or not the packet was received during the self-ID period, to the trailer (broadly speaking, control information) of each packet, as shown in FIG. 20B.

In other words, PHY packets handled by the physical layer include link-on packets and PHY configuration packets, in addition to self-ID packets, as shown in FIGS. 4A to 4D. With this embodiment of the invention, it is preferable that the firmware can distinguish between self-ID packet and other PHY packets (link-on packets and PHY configuration packets) in a simple manner. That is because a data pointer is appended to the self-ID packet, so that the firmware handles the self-ID packet in a different manner from other PHY packets.

However, it is not possible to distinguish what type of PHY packet is to be processed, even if tcode, which has been standardized by IEEE 1394 as information for distinguishing the packet type, is used.

With this embodiment of the invention, BR, which indicates whether or not the packet was received during the self-ID period, is appended to the trailer of each packet, as shown in FIG. 20B. This makes it possible for the firmware or the like to distinguish whether a packet is a self-ID packet or another PHY packet in a simple manner, reducing the processing load.

Note that this embodiment of the invention preferably erases the parity information in the second quadlet of each self-ID packet and forms the data portion of the re-packaged packet by linking together the self-ID packets without the erased parities (the data of the self-ID packets). This makes it possible to reduce the size of the re-packaged packet to approximately half that of a packet formed by not erasing the parities, enabling a further reduction in the capacity of RAM that is necessary for storing the self-ID packet.

Figure 21A:
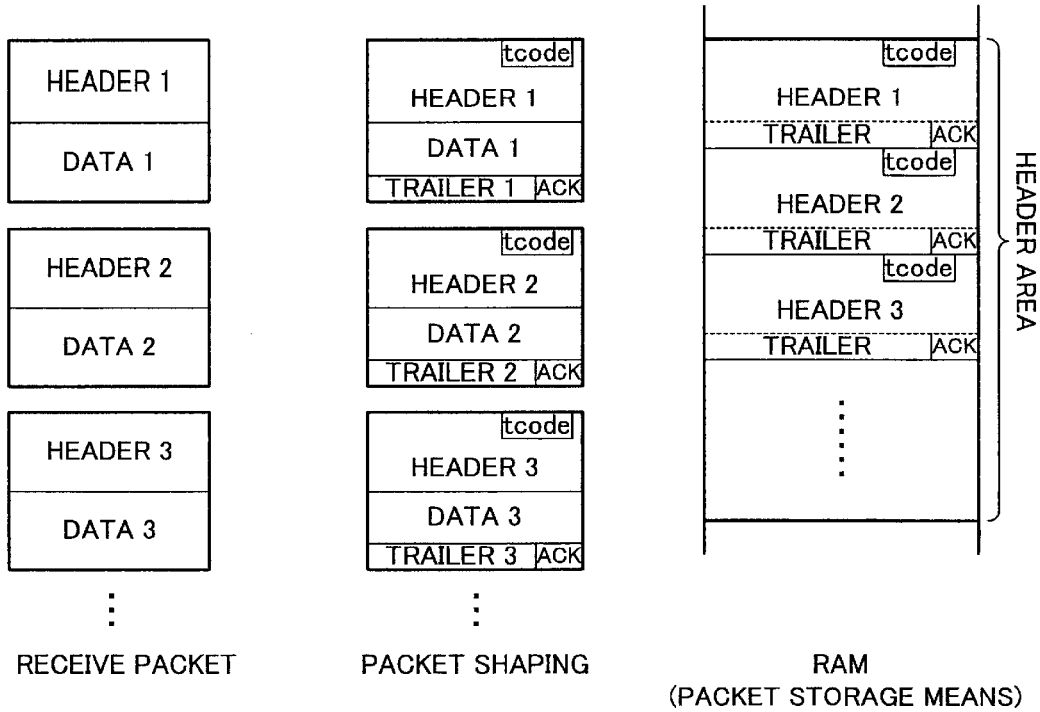
FIGS. 21A and 21B are illustrative of a method of taking information that was appended to the rearmost end of a packet in a time series during packet shaping and writing that information to the foremost end of a header of a packet in RAM.

If a destination node receives a packet by asynchronous transfer, the destination (transfer destination) node sends ACK to the source (transfer originator) node, as was described with reference to FIG. 1A. At the same time, the link core of the destination node takes the ACK that was sent to the source node and appends it to the received packet. This makes it possible to transfer the ACK that was sent to the source node to an upper layer such as the firmware. More specifically, the packet shaping circuit 160 of FIG. 14 appends ACK to the trailer as shown in FIG. 21A. This ACK is a 4-bit code that can be used to indicate a state such as acknowledgment complete, acknowledgment pending, acknowledgment busy, or acknowledgment error.

However, ACK is appended to the trailer which is in the rearmost end of a time series during packet shaping, and ACK is written to the rearmost end of the header in the RAM, as shown in FIG. 21A. This means that the processing described below must be done when the firmware confirms ACK. First of all, the firmware decodes the 4-bit tcode at the foremost end of the header, to check the size of the header. It then calculates the address at which the ACK (trailer) is stored, based on this header size, and reads ACK. The processing for confirming ACK is therefore a heavy load on the firmware, impeding any improvement in the actual transfer speed of the entire system. In particular, if there is an acknowledgment error or the like, the processing for confirming ACK will all be wasted.

Figure 21B:
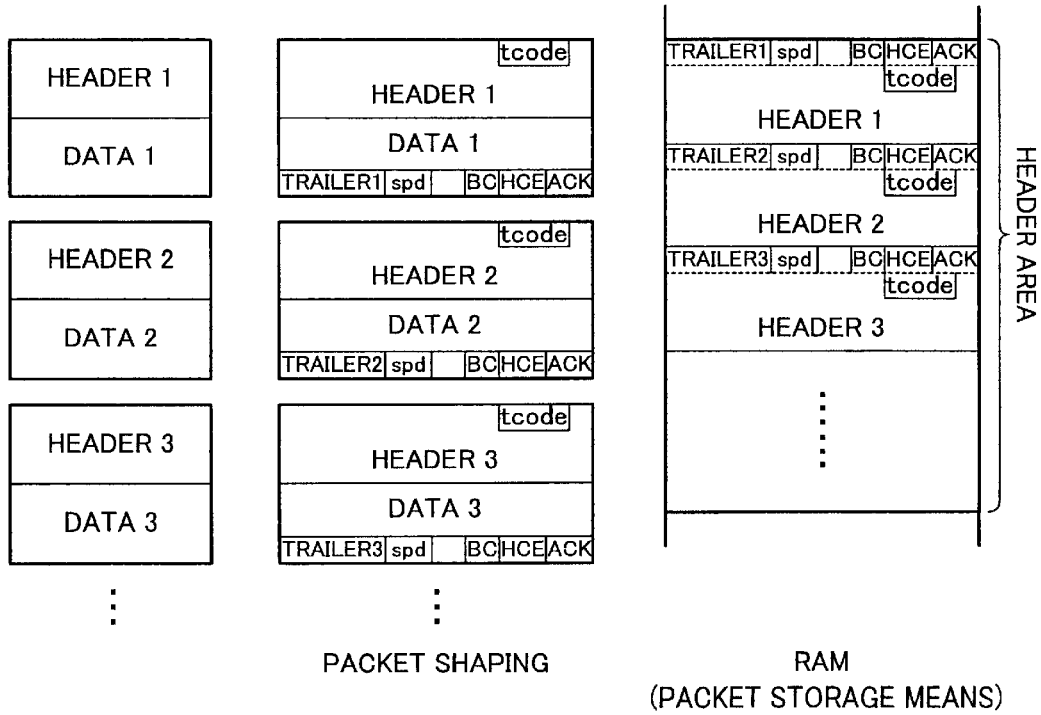

With this embodiment of the invention, the given information, such as ACK, that is appended to the rearmost end of the packet in a time series during the packet shaping could be written to the foremost end of the header of the packet (such as in the very first quadlet) in RAM, as shown in FIG. 21B. This would make it possible for the firmware to confirm the given information, such as ACK, without decoding tcode. This is because ACK or the like is stored at the foremost end of the header and thus it is not necessary to check details such as the size of the header from tcode.

Note that it is also possible to fix the header length (header size) and write the given information, such as ACK, to the header area. If the header length is fixed in this manner, the firmware can access the given information in a simple manner, regardless of which quadlet in which fixed-length header within the header area contains the given information, such as ACK. In such a case, it is more preferable to store this given information in the initial quadlet or final quadlet of any fixed-length header within the header area. This configuration makes it possible to retain the continuity of data within the header better than when the given information is stored elsewhere than in the initial or final quadlet of the fixed-length header.

In addition to ACK (acknowledgment information sent to the source node), various other kinds of information could be considered as the above described given information, such as spd (speed code information for specifying the speed of data transfer), BC (broadcast information indicating whether or not the packet has been sent to all nodes connected to that bus), BR (information indicating whether or not the packet was received during the self-ID period), or HCE (error status information indicating whether or not there was an error in that packet).

3.2 Configuration

Figure 22:
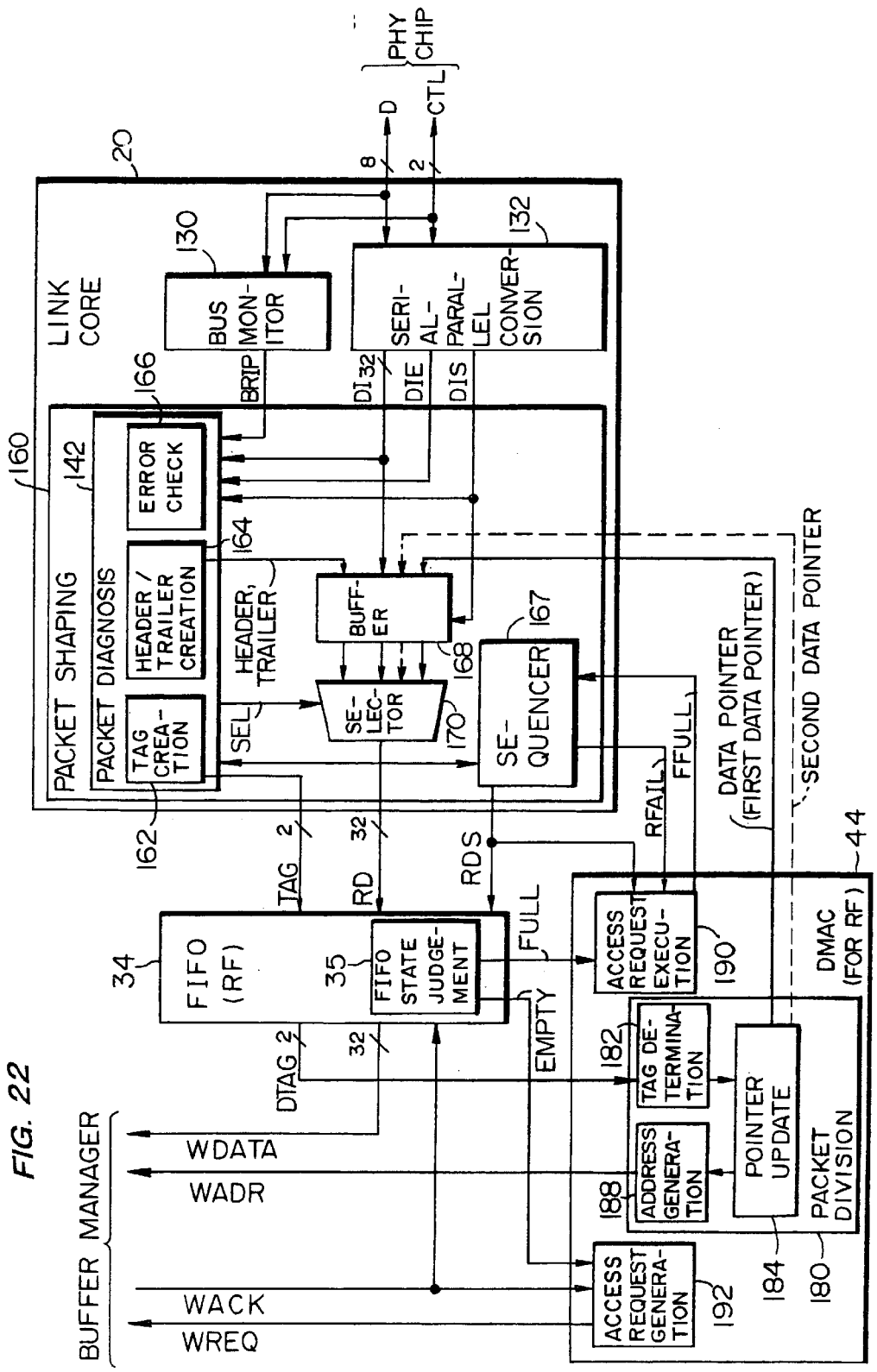
FIG. 22 shows an example of the configuration of the reception side.

A detailed example of the configuration of the link core 20, the FIFO 34, and the DMAC 44 is shown in FIG. 22.

The link core 20 comprises a bus monitor circuit 130, a serial-parallel conversion circuit 132, and a packet shaping circuit 160. The packet shaping circuit 160 comprises a packet diagnosis circuit 142, a sequencer 167, a buffer 168, and a selector 170; and the packet diagnosis circuit 142 comprises a tag creation circuit 162, a header/trailer creation circuit 164, and an error check circuit 166.

The bus monitor circuit 130 monitors the 8-bit data bus D and the 2-bit control bus CTL that are connected to the PHY chip by the PHY interface 10.

The serial-parallel conversion circuit 132 converts the data on the data bus D into 32-bit data. For example, if the transfer speed is 400 Mbps, 8-bit data is converted into 32-bit data; if the transfer speed is 200 Mbps, 4-bit data is converted into 32-bit data; and if the transfer speed is 100 Mbps, 2 bit data is converted into 32-bit data.

The packet diagnosis circuit 142 is a circuit that diagnoses packets. The tag creation circuit 162 creates tags for delimiting the header, data, trailer, etc., and the header/trailer creation circuit 164 creates headers and trailers (footers). The error check circuit 166 investigates error check information, such as parity information, comprised within each packet, to detect any errors therein.

The sequencer 167 creates various control signals. The buffer 168 and the selector 170 select one of DI from the serial-parallel conversion circuit 132, a header and trailer from the packet diagnosis circuit 142, or data pointers from the DMAC 44, using a SEL signal from the packet diagnosis circuit 142.

The FIFO 34 functions as a buffer for adjusting the phase of RD (which is output data from the link core 20) and the phase of WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 (write means) comprises a packet division circuit 180, an access request execution circuit 190, and an access request generation circuit 192.

The packet division circuit 180 is a circuit that divides packets that have been shaped by the packet shaping circuit 160, then writes the headers and trailers to the header area of the RAM 80 and the data to the data area thereof (see FIG. 12). The packet division circuit 180 comprises a tag determination circuit 182, a pointer update circuit 184, and an address generation circuit 188.

The tag determination circuit 182 identifies the tags (DTAG) created by the tag creation circuit 162.

The pointer update circuit 184 receives an output from the tag determination circuit 182 and updates the header pointer (broadly speaking, a control information pointer) and data pointer, for writing the header and data to the RAM 80.

The address generation circuit 188 receives an output from the pointer update circuit 184 and issues a write address WADR to the RAM 80.

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (RxData) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit 192 receives WACK (which is a write acknowledgment from the buffer manager 70) and EMPTY from the FIFO state judgement circuit 35, and outputs WREQ (which is a write request) to the buffer manager 70.

3.3 Reception-Side Operation

The operation of this embodiment will now be described with reference to the timing waveform chart of FIG. 23.

The description first concerns the operation of the link core 20.

When a packet is received from another node through the PHY chip, the packet diagnosis circuit 142 diagnoses that packet. The header/trailer creation circuit 164 then creates (shapes) a header. This header is input to the selector 170 through the buffer 168 and the selector 170 selects that header on the basis of the SEL signal from the packet diagnosis circuit 142. This ensures that the header (H0 to H4) is output to the FIFO 34 as RD, as shown at A1 in FIG. 23.

Note that the format of an asynchronous packet transferred over the serial bus (the IEEE 1394 standard) is shown in FIG. 24A. The format of the header portion of the asynchronous receive packet stored in the header area of the RAM 80 is shown in FIG. 24B (the hatched portion in this figure represents the trailer). In the embodiment as configured above, a packet in the format of FIG. 24A is shaped into a packet of the format of FIG. 24B, to ensure that it can be used by an upper layer such as firmware.

With this embodiment of the invention, the fourth quadlet H4 of the header (at A2 in FIG. 23) becomes a data pointer for fetching data from the data area, as shown in FIG. 24B. This data pointer (H4) is input from the DMAC 44 (the pointer update circuit 184) to the selector 170 through the buffer 168, and the selector 170 selects it. In this manner, the packet shaping circuit 160 accepts the data pointer from the DMAC 44 and this data pointer is embedded in the header that is written to the RAM 80.

The data portion of the packet is then sent from PHY chip over the data bus D. The serial-parallel conversion circuit 132 converts this data portion into DI, which is 32-bit data, and outputs it to the packet diagnosis circuit 142 and the buffer 168.

Note that DIE is a signal indicating whether DI is enabled or disabled and DIS is a signal for determining the timing to fetch DI.

The DI signal from the serial-parallel conversion circuit 132 is input to the selector 170 through the buffer 168, and the selector 170 selects it. This causes data D0 to Dn to be output to the FIFO 34 as RD, as shown at A3.

A trailer from the header/trailer creation circuit 164 is then input to the selector 170 through the buffer 168, and the selector 170 selects it. This causes the trailer (H5, the portion shown hatched in FIG. 24B) to be output to the FIFO 34 as RD, as shown at A4.

The tag creation circuit 162 creates tags for delimiting the information that is being output as RD. In this embodiment of the invention, each tag has two bits, as shown in FIG. 15, where (00), (01), (10), and (11) indicate header, trailer, data, and start (top of the header), respectively. Therefore, the tags shown in FIG. 23 by way of example change in the sequence: (11), (00), . . . , (10), . . . , (01). The configuration is such that 34-bit data consisting of these 2-bit tags and the 32-bit RD are input to the FIFO 34.

The description now turns to the operation of the FIFO 34.

The FIFO 34 receives tags and RD from the link core 20, and outputs them as DTAG and WDATA, as shown at A5 and A6.

The FIFO state judgement circuit 35 within the FIFO 34 uses an internal counter to count the number of data items (FIFO count) in the FIFO 34. When the FIFO 34 becomes full (when the number of data items is 2), FULL goes active (high) as shown at A7 in FIG. 23. When the FIFO 34 becomes empty (when the number of data items is 0), EMPTY becomes active as shown at A8. The fact that the FIFO 34 is full is conveyed by FULL and FFULL to the access request execution circuit 190 within the DMAC 44 and the sequencer 167 within the link core 20. The fact that the FIFO 34 is empty is conveyed by EMPTY to the access request generation circuit 192 within the DMAC 44.

The description now turns to the operation of the DMAC 44.

The access request generation circuit 192 makes WREQ go active, as shown at A10, on condition that EMPTY is inactive (low) as shown at A9 (indicating that the FIFO 34 is not empty). If WACK is accepted from the buffer manager 70, WREQ goes inactive.

In this embodiment of the invention, access requests from the DMAC 44 have the highest priority during bus arbitration for reception. Therefore, if there is a conflict between WREQ from the DMAC 44 and an Other WREQ from the CPU interface 60 and the DMAC 54 for ports, as shown at A10 and A11, WREQ has priority. In other words, WACK goes active before the Other WACK, as shown at A12 and A13. The reason why WREQ is given priority in this manner when there is a conflict between WREQ and Other WREQ is discussed below. Under IEEE 1394, packets from other nodes are transferred in succession, synchronized with the transfer clock, unlike with SCSI and other such standards. It is therefore necessary to give the transferred packets priority and store them in the RAM 80 in succession, without pausing.

With this embodiment of the invention, an access request from the DMAC 44 is made to wait only for a given time between the acceptance of access requests from the CPU interface 60 and the DMAC 54 for ports, as shown at A14. This means that RD from the link core 20 and WDATA to the buffer manager 70 are not synchronized. For that reason, this embodiment of the invention is provided with the FIFO 34 for adjusting the phases of RD and WDATA. In this case, the FIFO 34 could be provided with the minimum number of stages necessary for phase adjustment (preferably no more than three stages; more preferably no more than two stages).

The tag determination circuit 182 comprised within the packet division circuit 180 determines each DTAG that is output from the FIFO 34 together with WDATA, to identify whether WDATA refers to the start (top of the header), header, data, or trailer. The pointer update circuit 184 updates the header pointer and the data pointer based on this result. The address generation circuit 188 then generates WADR (the write address for WDATA) based on the updated header pointer and data pointer.

Figure 25A:
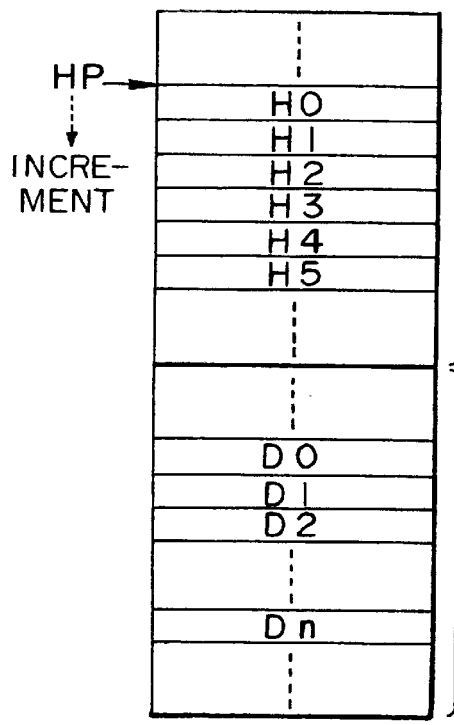
FIGS. 25A, 25B, 25C, and 25D are illustrative of the updating of the header pointer and data pointer.

More specifically, if it is determined from the DTAG that WDATA is the start or the header, for example, the pointer update circuit 184 increments (broadly speaking, updates) the header pointer HP, as shown in FIG. 25A. The address generation circuit 188 issues WADR in accordance with the thus incremented header pointer, as shown at A15 in FIG. 23.

Figure 25B:
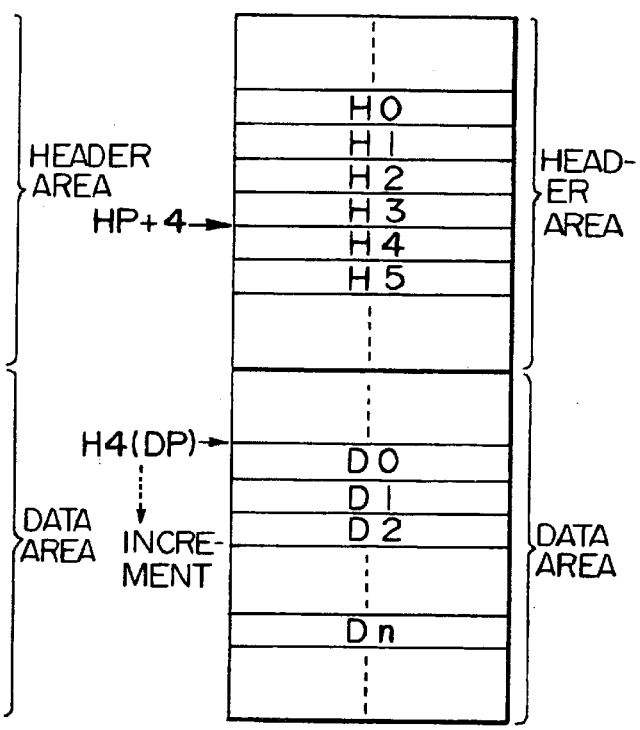

If it has been determined from the DTAG that WDATA is data, the pointer update circuit 184 increments the data pointer DP, as shown in FIG. 25B. This data pointer DP is equivalent to H4 which has been embedded in the fourth quadlet of the header by the packet shaping circuit 160. The address generation circuit 188 issues WADR in accordance with the thus incremented data pointer, as shown at A16 in FIG. 23.

Figure 23:
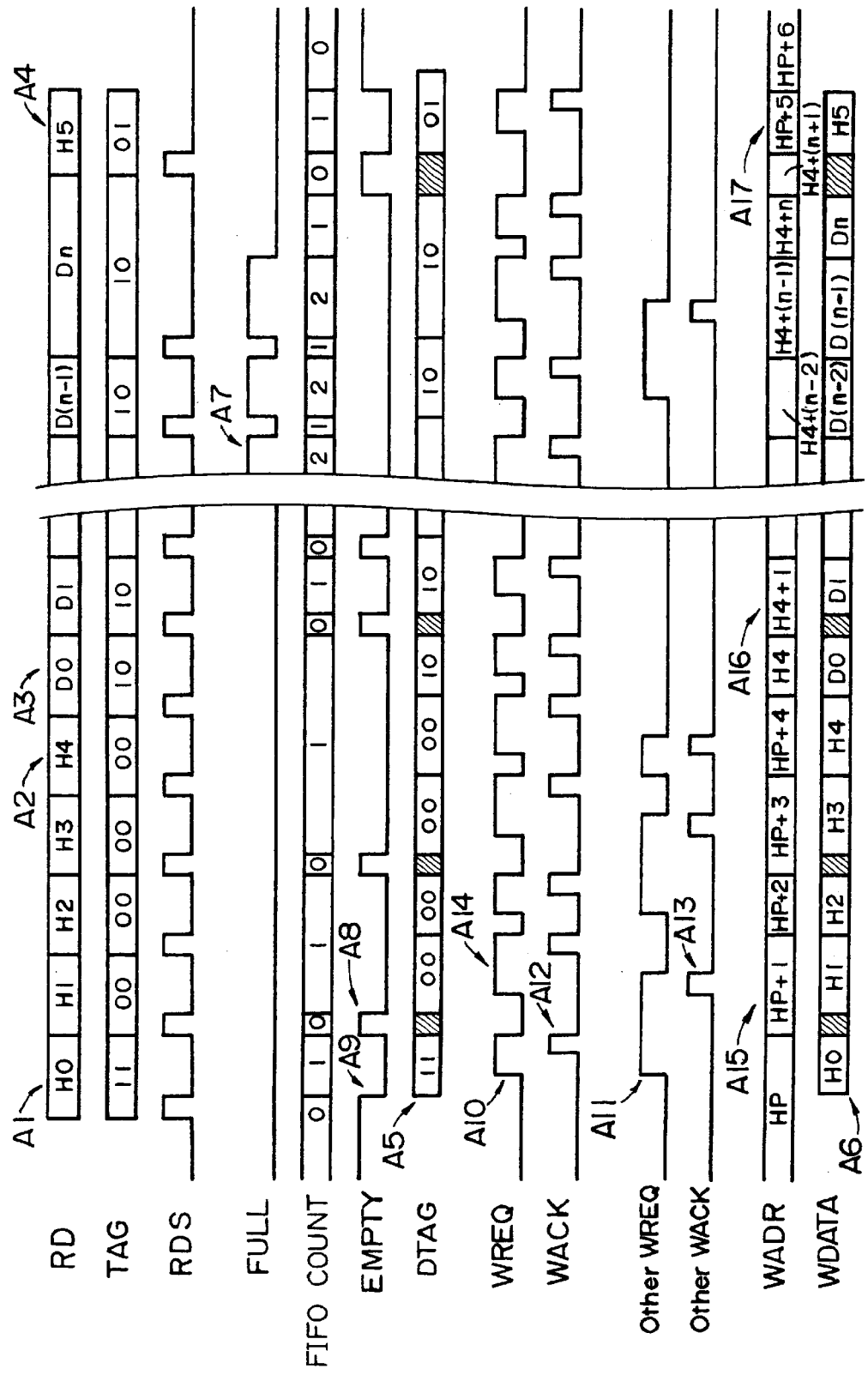
FIG. 23 is a timing waveform chart illustrating the operation of the reception side.
Figure 25C:
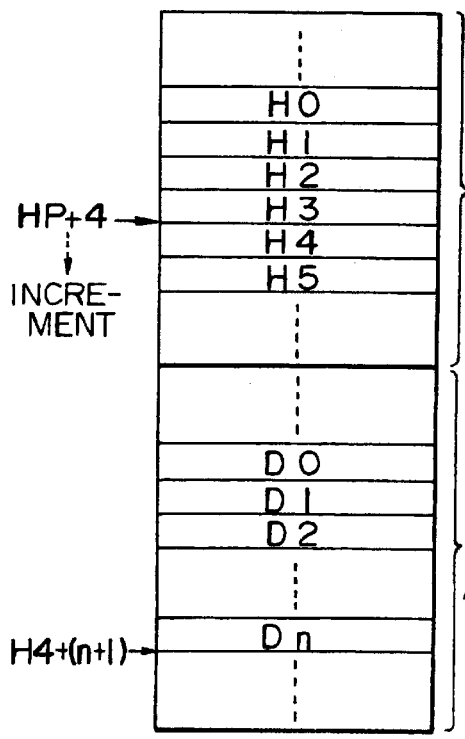

If it has been determined from the DTAG that WDATA is a trailer, the pointer update circuit 184 increments the header pointer, as shown in FIG. 25C The address generation circuit 188 issues WADR in accordance with the thus incremented header pointer, as shown at A17 in FIG. 23.

Figure 25D:
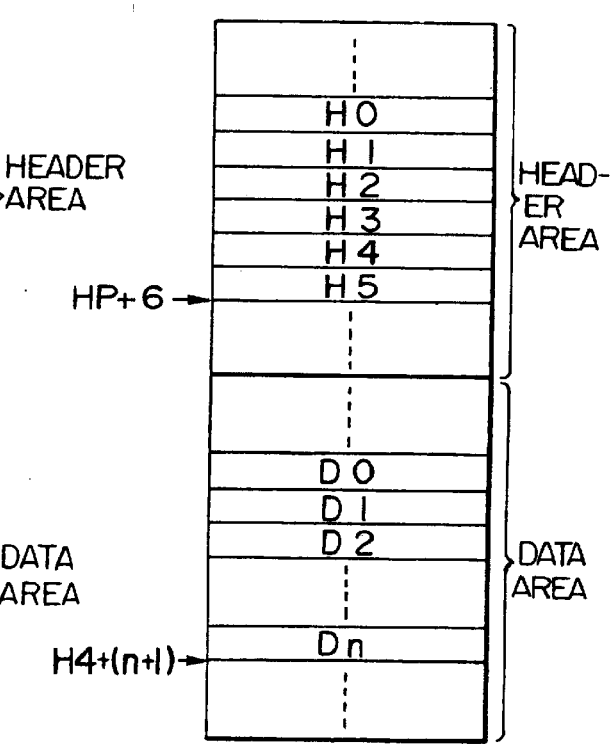

Note that the header pointer eventually ends up indicating the lower boundary of the header portion of the packet that has been processed (the upper boundary of the header portion of the next packet), as shown in FIG. 25D. The data pointer is set to indicate the lower boundary of the data portion of the packet (the upper boundary of the data portion of the next packet). The final positions of the header pointer and data pointer are restored to a header pointer setting register and a data pointer setting register within the register 46 of FIG. 6, on condition that the reception did not fail (RFAIL is inactive).

As described above, it is possible to divide the packet and write the contents to the header area and data area as appropriate.

Note that the settings of boundaries that divide up the area of the RAM 80, such as the boundary between the header area and the data area (P1 to P6 in FIG. 16) is implemented by the CPU 66 (firmware, or the like) setting pointers that indicate the addresses of the boundaries, and sending them through the CPU interface 60 into the pointer setting registers within the register 46.

If the data area is divided into a plurality of areas (if it is divided into areas for isochronous transfer and asynchronous transfer, as shown by way of example in FIG. 16, or into areas for first and second asynchronous transfers), it is preferable that packet data is written into one of this plurality of areas, based on control information of the packet such as tcode, by way of example.

More specifically, assume that the DMAC 44 passes a plurality of data pointers, such as first and second data pointers, to the packet shaping circuit 160 (it is equally possible to pass three or more data pointers in this manner), as shown in FIG. 22. The packet shaping circuit 160 selects the first data pointer from the DMAC 44 during isochronous transfer (or during the second asynchronous transfer), or the second data pointer from the DMAC 44 during asynchronous transfer (or during the first asynchronous transfer if there is more than one). In other words, the packet diagnosis circuit 142 within the packet shaping circuit 160 determines whether this is an isochronous transfer or an asynchronous transfer (or whether it is the second asynchronous transfer or the first asynchronous transfer), based on control information of the packet such as tcode, and controls the SEL signal, based on that determination result. The configuration is such that one of the first and second data pointers that are input to the selector 170 through the buffer 168 is selected thereby. This causes the first data pointer to be embedded in a packet for isochronous transfer (or second asynchronous transfer) and the second data pointer to be embedding in a packet for asynchronous transfer (or first asynchronous transfer if there is more than one). As a result, it is possible to store data continuously in a specific area within the data area. In other words, moving image data from a digital camera can be stored continuously in the data area for isochronous transfer and print data for a printer can be stored continuously in the second data area for asynchronous transfer (storing control data such as command data and status data in the first data area for asynchronous transfer).

With this embodiment of the invention, spd (speed code information for specifying the speed of data transfer), BC (broadcast information indicating whether or not the packet has been sent to all nodes connected to that bus), HCE (error status information indicating whether or not there was an error in that packet), or ACK (acknowledgment information sent to the source node) is appended to the rearmost end of the header, as shown in FIG. 24B. These spd, BC, HCE, and ACK items are generated by the header/trailer creation circuit 164 within the link core 20 of FIG. 22 and are appended by the functions of the buffer 168 and the selector 170.

The error check circuit 166 of FIG. 22 checks the header CRC of the receive packet and, if it finds an error in the header of the receive packet, it sets HCE to 1. When HCE is set to 1, RFAIL goes active. When RFAIL goes active, the final position of the data pointer (H4+(n+1) in FIG. 25D) is not restored to the data pointer setting register within the register 46 of FIG. 6. This implements processing that returns the data pointer DP to the originator and invalidates data 3, as was described with reference to FIG. 18B.

The format of the header portion that is stored in the header area of the RAM 80 when the packet is a self-ID packet is shown in FIG. 26A and the format of the header portion that is stored in the header area when the packet is a PHY packet other than a self-ID packet is shown in FIG. 26B.

If a packet is a self-ID packet sent in during the self-ID period, BR, which indicates whether or not the packet was received during the self-ID period, is set to 1, as shown in FIG. 26A. If the packet is a link-on packet or PHY configuration packet sent in outside of the self-ID period, BR is set to 0 as shown in FIG. 26B. This enables the firmware to distinguish between these packets, even when tcode is the same 0xE.

Note that spd, BC, HCE, ACK, and BR are shown in FIGS. 24B, 26A, and 26B as being appended to the rearmost end of the header, but spd, BC, HCE, ACK, and BR could equally well be appended to the foremost end of the header, as was described with reference to FIG. 21B.

4. Electronic Equipment

The description now turns to examples of electronic equipment comprising the data transfer control device of this embodiment.

Figure 27A:
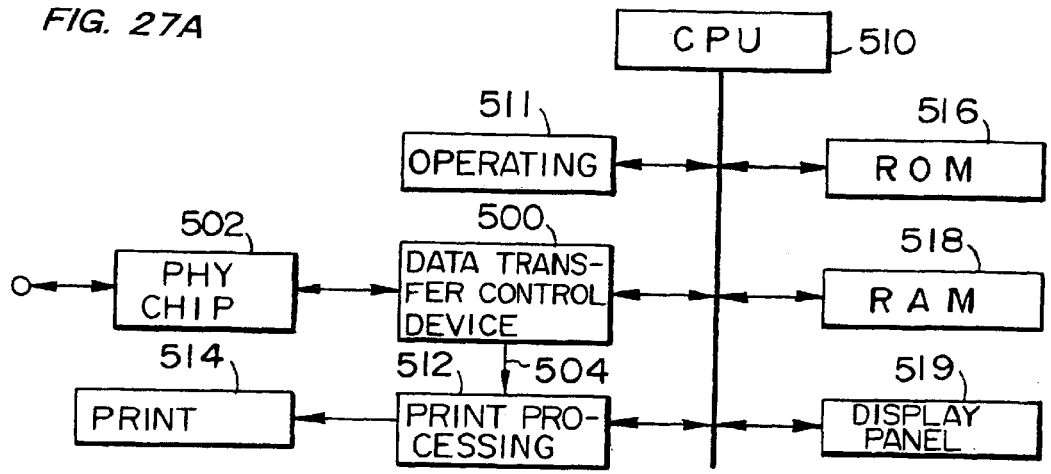
FIGS. 27A, 27B, and 27C show examples of the internal block diagrams of various items of electronic equipment.
Figure 28A:
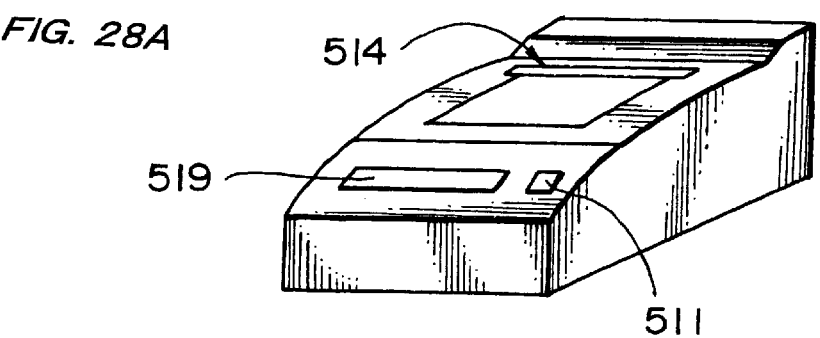
FIGS. 28A, 28B, and 28C show external views of various items of electronic equipment.

An internal block diagram of a printer that is one example of such electronic equipment is shown in FIG. 27A with an external view thereof being shown in FIG. 28A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY chip 502 and a data transfer control device 500 is sent directly to a print processing section 512 over a bus 504. The print data is subjected to given processing by the print processing section 512 and is output for printing to paper by a print section (a device for outputting data) 514.

Figure 27B:
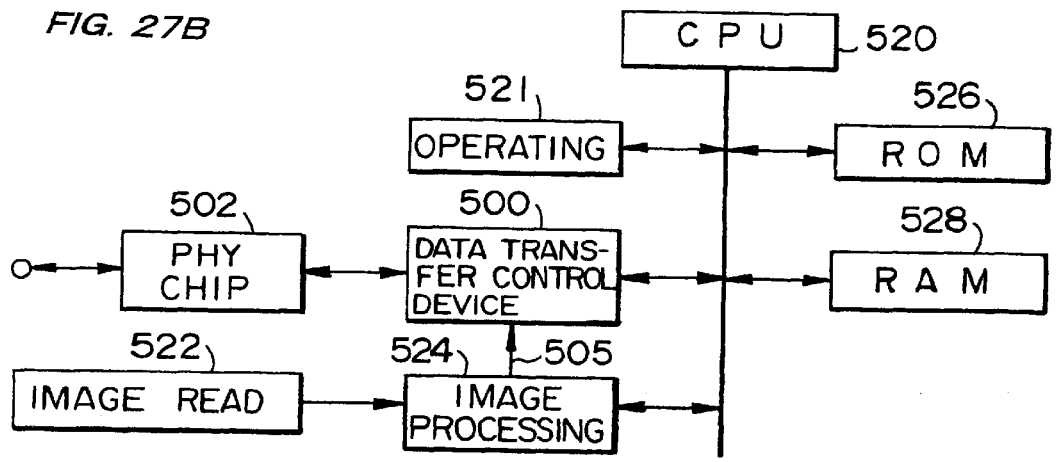
Figure 28B:
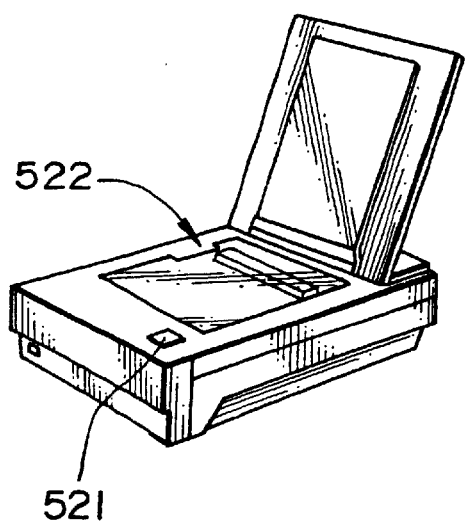

An internal block diagram of a scanner that is another example of electronic equipment is shown in FIG. 27B with an external view thereof being shown in FIG. 28B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY chip 502 to another node such as a personal computer.

Figure 27C:
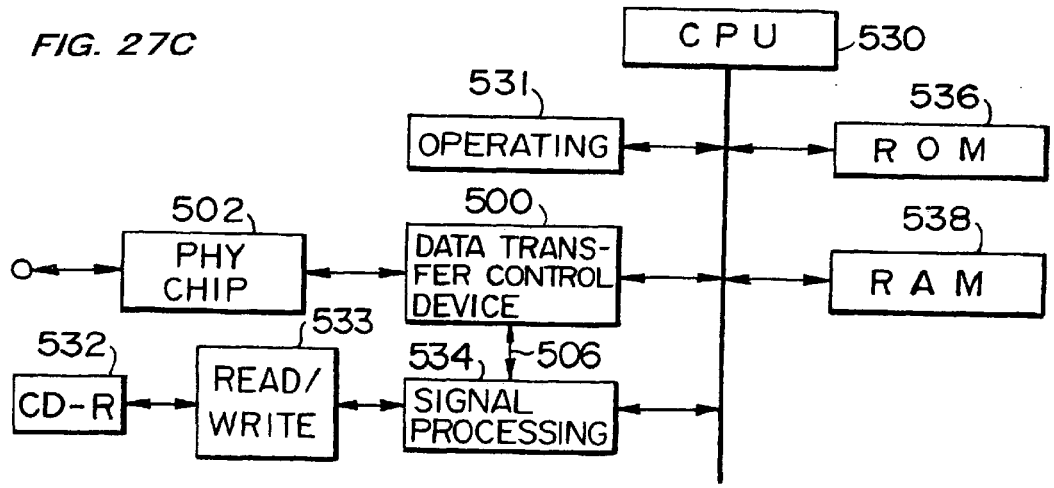
Figure 28C:
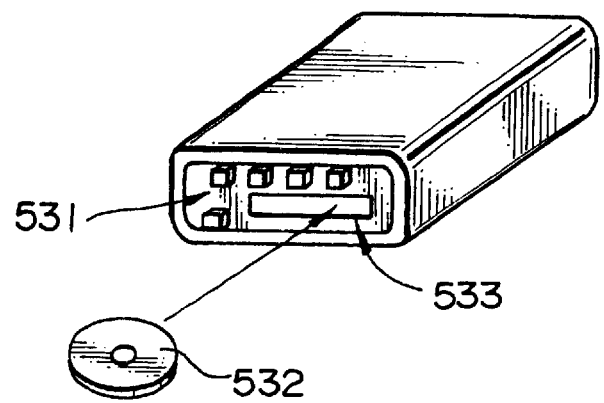

An internal block diagram of a CD-R drive that is a further example of electronic equipment is shown in FIG. 27C with an external view thereof being shown in FIG. 28C. A CPU 530 has various functions, including that of controlling the entire system. An operating section 531 is designed to allow the user to operate the CD-R. Data such as a control program is stored in a ROM 536 and a RAM 538 functions as a work area for the CPU 530.

Data read out from a CD-R 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by a read/write section 533 in the CD-R 532.

Note that another CPU for data transfer control by the data transfer control device 500 could be provided in addition to the CPU 510, 520, or 530 of FIGS. 27A, 27B, or 27C.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-R or write data to a CD-R at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses, which enables reductions in the cost and size of the data transfer control device, thus reducing the cost and size of the electronic equipment.

Note that the electronic equipment that can employ a data transfer control device in accordance with the present invention is not limited to the above described embodiments, and thus that various other examples can be considered, such as various types of optical disk drive (CD-ROM or DVD), magneto-optic disk drives (MO), hard disk drives, TVs, VTRs, video cameras, audio equipment, telephones, projectors, personal computers, electronic data book, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 6, but it is not limited thereto. In particular, the invention that was described above as relating to broadcast information, error status information, or information indicating whether or not a packet was received during a self-identification period, where this information is appended to control information of the packet, or where given information which is at the rearmost end of a time series is written to the foremost end of the control information of the packet, is not limited to the configuration of FIG. 6 but various other configurations can be utilized therefor, such as that shown in FIG. 8.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, said data transfer control device comprising:

a packet shaping circuit which shapes each packet that has been transferred from a node into a form that can be used by an upper layer; and a packet division circuit which writes control information of the thus-shaped packet into a control information area of a randomly accessible storage memory and data of the thus-shaped packet into a data area of said storage memory;

wherein said packet division circuit passes to said packet shaping circuit a data pointer indicating an address of data written into said data area; and wherein said packet shaping circuit takes said data pointer passed from said packet division circuit and appends said data pointer to control information of the thus-shaped packet.

2. The data transfer control device as defined in claim 1, wherein said packet shaping circuit generates tag information for distinguishing between at least control information and data of a packet and also links the thus generated tag information to said packet; and wherein said packet division circuit writes control information of the packet to said control information area and data of the packet to said data area, based on said tag information linked to said packet.

3. The data transfer control device as defined in claim 2, wherein said packet division circuit updates a control information pointer indicating an address of control information that is written into said control information area, when it is determined from said tag information linked to said packet that control information of the packet is to be written, or updates a data pointer indicating an address of data that is written into said data area, when it is determined from said tag information linked to said packet that data of the packet is to be written.

4. The data transfer control device as defined in claim 1, further comprising:
 a first bus connected to a next-stage application;
 a second bus for controlling said data transfer control device;
 a third bus connected electrically to a physical-layer device;
 a fourth bus connected electrically to said storage memory; and
 an arbitration circuit which performs arbitration for establishing a data path between any one of said first, second, and third buses and said fourth bus.

5. The data transfer control device as defined in claim 1, further comprising:
 a FIFO between said packet shaping circuit and said storage memory.

6. The data transfer control device as defined in claim 1, wherein data transfer is performed in accordance with the IEEE 1394 standard.

7. Electronic equipment comprising:
 a data transfer control device as defined in claim 1;
 a device for performing given processing on data that has been received from another node via said data transfer control device and said bus; and
 a device for outputting or storing data that has been subjected to said processing.

8. Electronic equipment comprising:
 a data transfer control device as defined in claim 1;
 a device for performing given processing on data that is to be sent to another node through said data transfer control device and said bus; and
 a device for fetching data to be subjected to said processing.

9. A data transfer control device for transferring data among a plurality of nodes that are connected to a bus, said data transfer control device comprising:
 a packet shaping circuit which shapes each packet that has been transferred from a node into a form that can be used by an upper layer; and
 a write circuit which writes the thus-shaped packet to a storage memory;
 wherein said packet shaping circuit takes broadcast information indicating whether or not the packet has been sent to all nodes connected to said bus and appends said broadcast information to control information of the packet.

10. The data transfer control device as defined in claim 9, further comprising:

a first bus connected to a next-stage application;
 a second bus for controlling said data transfer control device;
 a third bus connected electrically to a physical-layer device;
 a fourth bus connected electrically to said storage memory; and
 an arbitration circuit which performs arbitration for establishing a data path between any one of said first, second, and third buses and said fourth bus.

11. The data transfer control device as defined in claim 9, further comprising:
 a FIFO between said packet shaping circuit and said storage memory.

12. The data transfer control device as defined in claim 9, wherein data transfer is performed in accordance with the IEEE 1394 standard.

13. Electronic equipment comprising:
 a data transfer control device as defined in claim 9;
 a device for performing given processing on data that has been received from another node via said data transfer control device and said bus; and
 a device for outputting or storing data that has been subjected to said processing.

14. Electronic equipment comprising:
 a data transfer control device as defined in claim 9;
 a device for performing given processing on data that is to be sent to another node through said data transfer control device and said bus; and
 a device for fetching data to be subjected to said processing.

15. A data transfer control device for transferring data among a plurality of nodes that are connected to a bus, said data transfer control device comprising:
 a packet shaping circuit which shapes each packet that has been transferred from a node into a form that can be used by an upper layer; and
 a write circuit which writes the thus-shaped packet to a storage memory;
 wherein said packet shaping circuit takes error status information indicating whether or not there was an error in that packet and appends said error status information to control information of the thus-shaped packet.

16. The data transfer control device as defined in claim 15, further comprising:
 a packet division circuit which writes control information of the thus-shaped packet into a control information area of said storage memory and data of the thus-shaped packet into a data area of said storage memory;
 wherein data of a packet that has been written to said data area is invalidated when it is determined that there is an error in said packet.

17. The data transfer control device as defined in claim 16, further comprising:
 a first bus connected to a next-stage application;
 a second bus for controlling said data transfer control device;
 a third bus connected electrically to a physical-layer device;
 a fourth bus connected electrically to said storage memory; and
 an arbitration circuit which performs arbitration for establishing a data path between any one of said first, second, and third buses and said fourth bus.

18. The data transfer control device as defined in claim 16, further comprising:
a FIFO between said packet shaping circuit and said storage memory.

19. The data transfer control device as defined in claim 16, wherein data transfer is performed in accordance with the IEEE 1394 standard.

20. Electronic equipment comprising:
a data transfer control device as defined in claim 16;
a device for performing given processing on data that has been received from another node via said data transfer control device and said bus; and
a device for outputting or storing data that has been subjected to said processing.

21. Electronic equipment comprising:
a data transfer control device as defined in claim 16;
a device for performing given processing on data that is to be sent to another node through said data transfer control device and said bus; and
a device for fetching data to be subjected to said processing.

22. A data transfer control device for transferring data among a plurality of nodes that are connected to a bus, said data transfer control device comprising:
a packet shaping circuit which shapes each packet that has been transferred from a node into a form that can be used by an upper layer; and
a write circuit which writes the thus-shaped packet to a storage memory;
wherein said packet shaping circuit takes information indicating whether or not the packet was received during a self-identification period and appends said information to control information of the thus shaped packet.

23. The data transfer control device as defined in claim 22, further comprising:
a first bus connected to a next-stage application;
a second bus for controlling said data transfer control device;
a third bus connected electrically to a physical-layer device;
a fourth bus connected electrically to said storage memory; and
an arbitration circuit which performs arbitration for establishing a data path between any one of said first, second, and third buses and said fourth bus.

24. The data transfer control device as defined in claim 22, further comprising:
a FIFO between said packet shaping circuit and said storage memory.

25. The data transfer control device as defined in claim 22, wherein data transfer is performed in accordance with the IEEE 1394 standard.

26. Electronic equipment comprising:
a data transfer control device as defined in claim 22;
a device for performing given processing on data that has been received from another node via said data transfer control device and said bus; and
a device for outputting or storing data that has been subjected to said processing.

27. Electronic equipment comprising:
a data transfer control device as defined in claim 22;
a device for performing given processing on data that is to be sent to another node through said data transfer control device and said bus; and
a device for fetching data to be subjected to said processing.

28. A data transfer control device for transferring data among a plurality of nodes that are connected to a bus, said data transfer control device comprising:
a packet shaping circuit which shapes each packet that has been transferred from a node into a form that can be used by an upper layer; and
a write circuit which writes the thus-shaped packet to a storage memory;
wherein said packet shaping circuit appends given information to the rearmost end of each packet in a time series that has been transferred from each node; and
wherein said write circuit writes said given information at the foremost end of control information of the packet in said storage memory.

29. The data transfer control device as defined in claim 28, wherein said given information is at least one of:
acknowledgment information that has been sent to the transfer originator of that packet;
speed code information for specifying the speed of data transfer;
broadcast information indicating whether or not the packet has been sent to all nodes connected to said bus;
information indicating whether or not the packet was received during a self-identification period; and
error status information indicating whether or not there was an error in the packet.

30. The data transfer control device as defined in claim 28, further comprising:
a first bus connected to a next-stage application;
a second bus for controlling said data transfer control device;
a third bus connected electrically to a physical-layer device;
a fourth bus connected electrically to said storage memory; and
an arbitration circuit which performs arbitration for establishing a data path between any one of said first, second, and third buses and said fourth bus.

31. The data transfer control device as defined in claim 22, further comprising:
a FIFO between said packet shaping circuit and said storage memory.

32. The data transfer control device as defined in claim 28, wherein data transfer is performed in accordance with the IEEE 1394 standard.

33. Electronic equipment comprising:
a data transfer control device as defined in claim 28;
a device for performing given processing on data that has been received from another node via said data transfer control device and said bus; and
a device for outputting or storing data that has been subjected to said processing.

34. Electronic equipment comprising:
a data transfer control device as defined in claim 28;
a device for performing given processing on data that is to be sent to another node through said data transfer control device and said bus; and
a device for fetching data to be subjected to said processing.

* * * * *